United States Patent
Vehr et al.

(10) Patent No.: US 10,562,377 B2
(45) Date of Patent: Feb. 18, 2020

(54) BATTERY LIFE PREDICTION AND MONITORING

(71) Applicant: Emerson Climate Technologies, Inc., Sidney, OH (US)

(72) Inventors: Shawn W. Vehr, Dayton, OH (US); Joseph James Rozsnaki, Troy, OH (US); Joseph G. Marcinkiewicz, St. Peters, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 15/635,249

(22) Filed: Jun. 28, 2017

(65) Prior Publication Data

US 2018/0001744 A1 Jan. 4, 2018

Related U.S. Application Data

(60) Provisional application No. 62/356,652, filed on Jun. 30, 2016.

(51) Int. Cl.
 *B60H 1/00* (2006.01)
 *B60H 1/32* (2006.01)
 (Continued)

(52) U.S. Cl.
 CPC ............ *B60H 1/3226* (2013.01); *B60H 1/005* (2013.01); *B60H 1/3205* (2013.01);
 (Continued)

(58) Field of Classification Search
 CPC .... B60H 1/005; B60H 1/3205; B60H 1/3211; B60H 1/3226; B60H 2001/3272;
 (Continued)

(56) References Cited

U.S. PATENT DOCUMENTS 2,895,308 A 7/1959 Mcneil
4,043,144 A 8/1977 Klotz et al.
(Continued)

FOREIGN PATENT DOCUMENTS

JP 2002130891 A 5/2002
JP 4354372 B2 10/2009
(Continued)

OTHER PUBLICATIONS

Han-2014: "A comparative study of commercial lithium ion battery cycle life in electrical vehicle: Aging mechanism identification", Xuebing Han et al., Journal of Power Sources 251 (2014) 38-54.*

(Continued)

*Primary Examiner* — Edward F Landrum
*Assistant Examiner* — Chang H. Park
(74) *Attorney, Agent, or Firm* — Harness, Dickey & Pierce, P.L.C.

(57) ABSTRACT

A refrigeration system for a vehicle includes a compressor in fluid communication with a condenser and an evaporator. The compressor includes a variable speed motor and employs capacity modulation using refrigerant injection. The condenser and the evaporator include variable speed fans. The refrigeration system includes a battery to supply power to the refrigeration system. The battery is charged by one or more sources of power including the vehicle. The refrigeration system includes a control module configured to monitor one or more characteristics of the battery and to control one or more operating parameters of one or more of the compressor, the condenser, and the evaporator based on the one or more characteristics of the battery.

13 Claims, 10 Drawing Sheets

(51) Int. Cl.
*B60L 53/14* (2019.01)
*B60L 58/12* (2019.01)
*B60L 58/16* (2019.01)
*B60L 58/21* (2019.01)

(52) U.S. Cl.
CPC .......... *B60H 1/3211* (2013.01); *B60L 53/14* (2019.02); *B60L 58/12* (2019.02); *B60L 58/16* (2019.02); *B60L 58/21* (2019.02); *B60H 2001/3272* (2013.01); *B60H 2001/3275* (2013.01); *B60H 2001/3277* (2013.01); *B60H 2001/3292* (2013.01); *B60L 2240/547* (2013.01); *B60L 2240/549* (2013.01); *Y02T 10/7005* (2013.01); *Y02T 10/7044* (2013.01); *Y02T 10/7061* (2013.01); *Y02T 10/7072* (2013.01); *Y02T 90/14* (2013.01); *Y02T 90/16* (2013.01)

(58) Field of Classification Search
CPC .... B60H 2001/3275; B60H 2001/3277; B60H 2001/3292; B60L 11/1816; B60L 11/1857; B60L 11/1861; B60L 11/1864; B60L 2240/547; B60L 2240/549; B60L 58/10; B60L 58/12; B60L 58/16
See application file for complete search history.

(56) References Cited

U.S. PATENT DOCUMENTS

| | | |
|---|---|---|
| 4,328,855 A | 5/1982 | Iwata et al. |
| 4,616,484 A | 10/1986 | Mehdi et al. |
| 4,658,593 A | 4/1987 | Stenvinkel |
| 5,265,435 A | 11/1993 | Richardson |
| 5,395,224 A | 3/1995 | Caillat et al. |
| 5,651,260 A | 7/1997 | Goto et al. |
| 5,929,609 A | 7/1999 | Joy et al. |
| 6,230,507 B1 | 5/2001 | Ban et al. |
| 6,411,059 B2 | 6/2002 | Frugier et al. |
| 6,487,869 B1 | 12/2002 | Sulc et al. |
| 6,543,245 B1 | 4/2003 | Waldschmidt et al. |
| 6,622,505 B2 | 9/2003 | Anderson et al. |
| 6,640,564 B2 | 11/2003 | Yamashita et al. |
| 6,889,762 B2 | 5/2005 | Zeigler et al. |
| 7,040,877 B2 | 5/2006 | Bergman et al. |
| 7,174,736 B2 | 2/2007 | Chen et al. |
| 7,398,653 B2 | 7/2008 | Oomura et al. |
| 7,591,143 B2 | 9/2009 | Zeigler et al. |
| 7,832,221 B2 | 11/2010 | Wijaya et al. |
| 7,963,117 B2 | 6/2011 | Allen et al. |
| 7,966,839 B2 | 6/2011 | McEnaney et al. |
| 8,123,490 B2 | 2/2012 | Goto et al. |
| 8,161,758 B2 | 4/2012 | Bailey et al. |
| 8,181,478 B2 | 5/2012 | Ignatiev |
| 8,342,810 B2 | 1/2013 | Koyama |
| 8,453,722 B2 | 6/2013 | Zeigler et al. |
| 8,534,082 B2 | 9/2013 | Price et al. |
| 8,672,642 B2 | 3/2014 | Tolbert, Jr. et al. |
| 8,723,458 B1 | 5/2014 | Chambers |
| 8,769,982 B2 | 7/2014 | Ignatiev et al. |
| 8,935,933 B1 | 1/2015 | Koelsch |
| 9,126,544 B2 | 9/2015 | Larson et al. |
| 9,194,393 B2 | 11/2015 | Pham |
| 9,557,100 B2 | 1/2017 | Chopko et al. |
| 9,688,181 B2 | 6/2017 | Dutta et al. |
| 9,689,598 B2 | 6/2017 | Truckenbrod et al. |
| 10,230,236 B2 | 3/2019 | Schumacher et al. |
| 2003/0077179 A1 | 4/2003 | Collins et al. |
| 2003/0106332 A1 | 6/2003 | Okamoto et al. |
| 2003/0118450 A1 | 6/2003 | Iwanami et al. |
| 2003/0136138 A1 | 7/2003 | Tsuboi et al. |
| 2003/0201097 A1* | 10/2003 | Zeigler ............ B60H 1/00378 165/240 |
| 2004/0231831 A1 | 11/2004 | Houck et al. |
| 2006/0151163 A1 | 7/2006 | Zeigler et al. |
| 2007/0052241 A1 | 3/2007 | Pacy |
| 2007/0056300 A1 | 3/2007 | Crane |
| 2007/0131408 A1 | 6/2007 | Zeigler et al. |
| 2007/0151273 A1 | 7/2007 | Nelson et al. |
| 2007/0209378 A1 | 9/2007 | Larson |
| 2008/0011007 A1 | 1/2008 | Larson et al. |
| 2008/0014852 A1 | 1/2008 | Mielke et al. |
| 2008/0034773 A1 | 2/2008 | Karapetian |
| 2009/0011007 A1 | 1/2009 | Meier et al. |
| 2010/0011788 A1 | 1/2010 | Lifson et al. |
| 2010/0076664 A1 | 3/2010 | Monros |
| 2010/0080713 A1 | 4/2010 | Douglas et al. |
| 2010/0178175 A1 | 7/2010 | Koyama |
| 2010/0180614 A1 | 7/2010 | Larson et al. |
| 2010/0242510 A1 | 9/2010 | Kadle et al. |
| 2011/0110791 A1 | 5/2011 | Donnat et al. |
| 2011/0265506 A1 | 11/2011 | Alston |
| 2012/0152511 A1 | 6/2012 | Chang et al. |
| 2012/0198869 A1 | 8/2012 | Morita et al. |
| 2012/0262881 A1 | 10/2012 | Onimaru et al. |
| 2012/0290161 A1 | 11/2012 | Takeda et al. |
| 2013/0054072 A1 | 2/2013 | Christen et al. |
| 2013/0199223 A1 | 8/2013 | Brooke et al. |
| 2013/0240043 A1 | 9/2013 | Pham et al. |
| 2013/0248165 A1 | 9/2013 | Kandasamy |
| 2013/0333398 A1 | 12/2013 | Wendrock et al. |
| 2014/0020097 A1 | 1/2014 | Riou |
| 2014/0023519 A1 | 1/2014 | Li |
| 2014/0026599 A1 | 1/2014 | Rusignuolo et al. |
| 2014/0116673 A1 | 5/2014 | Kang et al. |
| 2014/0137580 A1 | 5/2014 | Peyaud et al. |
| 2014/0208789 A1 | 7/2014 | Lombardo et al. |
| 2014/0308138 A1 | 10/2014 | Pham |
| 2014/0311180 A1 | 10/2014 | Kawakami et al. |
| 2014/0338376 A1 | 11/2014 | Carpenter et al. |
| 2015/0013361 A1 | 1/2015 | Senf, Jr. et al. |
| 2015/0188360 A1 | 7/2015 | Doane et al. |
| 2015/0224852 A1 | 8/2015 | Wiedemann et al. |
| 2015/0314671 A1 | 11/2015 | Rajtmajer et al. |
| 2015/0352925 A1 | 12/2015 | Olyleye et al. |
| 2016/0033190 A1 | 2/2016 | Kim |
| 2016/0061504 A1 | 3/2016 | Penn, II et al. |
| 2016/0144764 A1 | 5/2016 | Dutta et al. |
| 2016/0144765 A1 | 5/2016 | Viegas et al. |
| 2016/0159339 A1 | 6/2016 | Cho et al. |
| 2016/0334154 A1 | 11/2016 | Srichai et al. |
| 2016/0361975 A1 | 12/2016 | Blatchley et al. |
| 2017/0100987 A1 | 4/2017 | Chopko et al. |
| 2017/0151859 A1 | 6/2017 | Dykes et al. |
| 2018/0001731 A1 | 1/2018 | Vehr et al. |
| 2018/0001738 A1 | 1/2018 | Vehr et al. |
| 2018/0001739 A1 | 1/2018 | Vehr et al. |
| 2018/0001740 A1 | 1/2018 | Vehr et al. |
| 2018/0001742 A1 | 1/2018 | Vehr et al. |
| 2018/0001745 A1 | 1/2018 | Vehr et al. |
| 2018/0001746 A1 | 1/2018 | Vehr et al. |
| 2018/0041137 A1 | 2/2018 | Iwata et al. |
| 2018/0320956 A1 | 11/2018 | Schumacher et al. |

FOREIGN PATENT DOCUMENTS

| | | |
|---|---|---|
| KR | 101462575 B1 | 11/2014 |
| WO | WO-0049349 A1 | 8/2000 |
| WO | WO-2015090191 A1 | 6/2015 |
| WO | WO-2016147022 A1 | 9/2016 |

OTHER PUBLICATIONS

International Search Report regarding International Application No. PCT/US2017/040236, dated Oct. 16, 2017.
Written Opinion of the International Searching Authority regarding International Application No. PCT/US2017/040236, dated Oct. 16, 2017.
International Search Report regarding International Application No. PCT/US2017/040200, dated Oct. 16, 2017.

(56) References Cited

OTHER PUBLICATIONS

Written Opinion of the International Searching Authority regarding International Application No. PCT/US2017/040200, dated Oct. 16, 2017.
International Search Report regarding International Application No. PCT/US2017/040344, dated Oct. 18, 2017.
Written Opinion of the International Searching Authority regarding International Application No. PCT/US2017/040344, dated Oct. 18, 2017.
International Search Report regarding International Application No. PCT/US2017/040193, dated Oct. 30, 2017.
Written Opinion of the International Searching Authority regarding International Application No. PCT/US2017/040193, dated Oct. 30, 2017.
International Search Report regarding International Application No. PCT/US2017/040310, dated Oct. 30, 2017.
Written Opinion of the International Searching Authority regarding International Application No. PCT/US2017/040310, dated Oct. 30, 2017.
Election/Restriction Requirement regarding U.S. Appl. No. 15/635,483 dated Apr. 25, 2018.
U.S. Appl. No. 15/635,239, filed Jun. 28, 2017, Shawn W. Vehr et al.
U.S. Appl. No. 15/635,372, filed Jun. 28, 2017, Shawn W. Vehr et al.
U.S. Appl. No. 15/635,444, filed Jun. 28, 2017, Shawn W. Vehr et al.
U.S. Appl. No. 15/635,483, filed Jun. 28, 2017, Shawn W. Vehr et al.
U.S. Appl. No. 15/635,688, filed Jun. 28, 2017, Shawn W. Vehr et al.
U.S. Appl. No. 15/635,760, filed Jun. 28, 2017, Shawn W. Vehr et al.
U.S. Appl. No. 15/635,779, filed Jun. 28, 2017, Shawn W. Vehr et al.
U.S. Appl. No. 15/583,424, filed May 1, 2017, Kolpe.
U.S. Appl. No. 15/583,491, filed May 1, 2017, Devanawar et al.
International Search Report regarding International Application No. PCT/US2017/040291, dated Sep. 21, 2017.
Written Opinion of the International Searching Authority regarding International Application No. PCT/US2017/040291, dated Sep. 21, 2017.
International Search Report regarding International Application No. PCT/US2017/040326, dated Sep. 21, 2017.
Written Opinion of the International Searching Authority regarding International Application No. PCT/US2017/040326, dated Sep. 21, 2017.
International Search Report regarding International Application No. PCT/US2017/040272, dated Sep. 22, 2017.
Written Opinion of the International Searching Authority regarding International Application No. PCT/US2017/040272, dated Sep. 22, 2017.

Non-Final Office Action regarding U.S. Appl. No. 15/635,760 dated Sep. 14, 2018.
Election/Restriction Requirement regarding U.S. Appl. No. 15/635,760 dated May 30, 2018.
Non-Final Office Action regarding U.S. Appl. No. 15/635,483 dated Aug. 1, 2018.
Non-Final Office Action regarding U.S. Appl. No. 15/635,372 dated Jan. 18, 2019.
Non-Final Office Action regarding U.S. Appl. No. 15/635,779 dated Dec. 26, 2018.
Restriction Requirement regarding U.S. Appl. No. 15/635,688 dated Dec. 6, 2018.
Applicant-Initiated Interview Summary regarding U.S. Appl. No. 15/635,483 dated Oct. 18, 2018.
Applicant-Initiated Interview Summary regarding U.S. Appl. No. 15/635,760 dated Dec. 5, 2018.
Election/Restriction Requirement regarding U.S. Appl. No. 15/635,688, dated Dec. 6, 2018.
Applicant-Initiated Interview Summary regarding U.S. Appl. No. 15/635,779 dated Feb. 20, 2019.
Lyon: "An All Electric Refrigerated Truck for Nestlé Switzerland," Renault Trucks Deliver Press Release, Corporate Communications Department; Jun. 2012; 2 Pages.
Notice of Allowance regarding U.S. Appl. No. 15/635,483 dated Jan. 10, 2019.
Notice of Allowance regarding U.S. Appl. No. 15/635,239, dated Mar. 15, 2019.
Notice of Allowance regarding U.S. Appl. No. 15/635,760, dated Apr. 2, 2019.
Notice of Allowance and Fees Due regarding U.S. Appl. No. 15/635,760 dated Feb. 20, 2019.
USPTO Office Communication forwarding Applicant-Initiated Interview Summary and Response to 312 Amendment regarding U.S. Appl. No. 15/635,483 dated Apr. 1, 2019.
Vijayenthiran, Viknesh "Mercedes beats Tesla to electric truck," Motor Authority; FoxNews.com; Published Oct. 11, 2016 <https://www.foxnews.com/auto/mercedes-beats-tesla-to-electric-truck>.
Non-Final Office Action regarding U.S. Appl. No. 15/635,444 dated Jun. 4, 2019.
Non-Final Office Action regarding U.S. Appl. No. 15/635,688 dated May 20, 2019.
Applicant-Initiated Interview Summary regarding U.S. Appl. No. 15/635,688 dated Aug. 2, 2019.
Applicant-Initiated Interview Summary regarding U.S. Appl. No. 15/635,444 dated Aug. 8, 2019.
Final Office Action regarding U.S. Appl. No. 15/635,779 dated Jul. 3, 2019.
Notice of Allowance regarding U.S. Appl. No. 15/635,372 dated Jul. 12, 2019.
Notice of Allowance regarding U.S. Appl. No. 15/635,372 dated May 31, 2019.

* cited by examiner

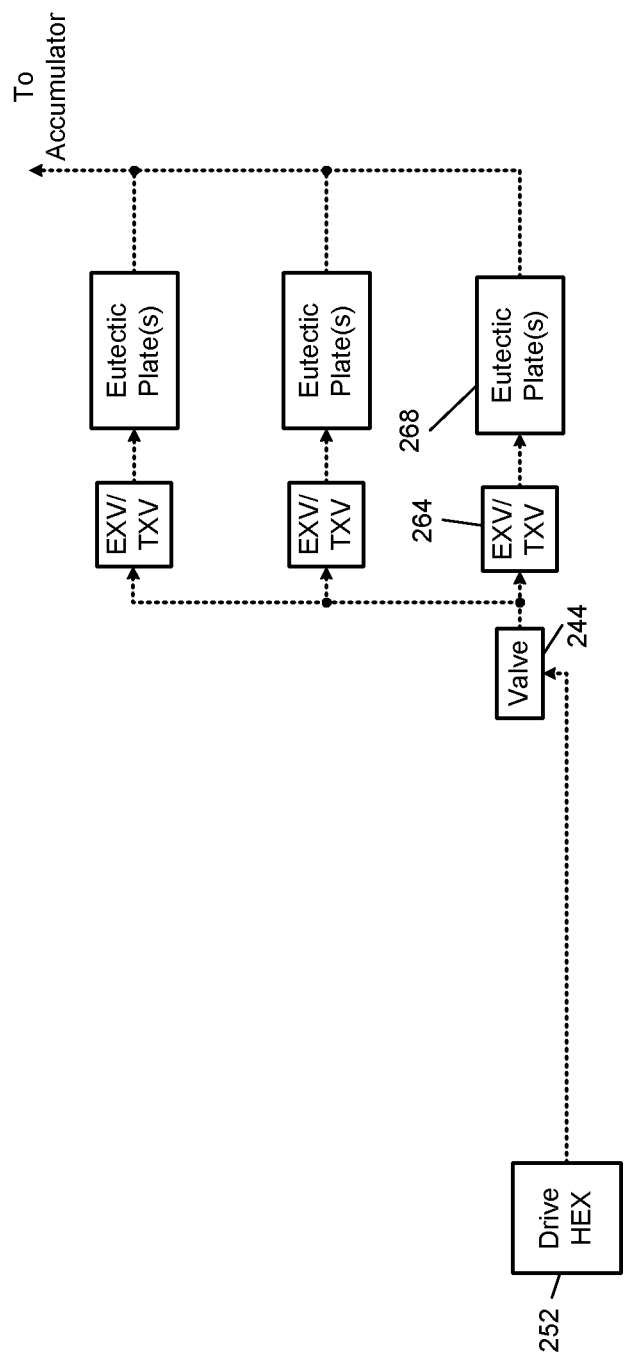

BATTERY LIFE PREDICTION AND MONITORING

CROSS-REFERENCE TO RELATED APPLICATIONS

This application claims the benefit of U.S. Provisional Application No. 62/356,652, filed on Jun. 30, 2016. The entire disclosure of the application referenced above is incorporated herein by reference The entire disclosures of each of the following applications are incorporated herein by reference: U.S. Provisional Application No. 62/356,608, filed Jun. 30, 2016; U.S. Provisional Application No. 62/356,620, filed Jun. 30, 2016; U.S. Provisional Application No. 62/356,626, filed Jun. 30, 2016; U.S. Provisional Application No. 62/356,631, filed Jun. 30, 2016; U.S. Provisional Application No. 62/356,639, filed Jun. 30, 2016; U.S. Provisional Application No. 62/356,647, filed Jun. 30, 2016; and U.S. Provisional Application No. 62/356,666, filed Jun. 30, 2016.

FIELD

The present disclosure relates to vehicles and, more particularly, to refrigeration systems of vehicles.

BACKGROUND

Compressors may be used in a wide variety of industrial and residential applications to circulate refrigerant to provide a desired heating or cooling effect. For example, a compressor may be used to provide heating and/or cooling in a refrigeration system, a heat pump system, a heating, ventilation, and air conditioning (HVAC) system, or a chiller system. These types of systems can be fixed, such as at a building or residence, or can be mobile, such as in a vehicle. Vehicles include land based vehicles (e.g., trucks, cars, trains, etc.), water based vehicles (e.g., boats), air based vehicles (e.g., airplanes), and vehicles that operate over a combination of more than one of land, water, and air.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

This section provides a general summary of the disclosure and is not a comprehensive disclosure of its full scope or all of its features.

A refrigeration system for a vehicle is provided and comprises a compressor in fluid communication with a condenser and an evaporator. The compressor includes a variable speed motor and employs capacity modulation using refrigerant injection. The condenser and the evaporator include variable speed fans. The refrigeration system comprises a battery to supply power to the refrigeration system. The battery is charged by one or more sources of power including the vehicle. The refrigeration system comprises a control module configured to monitor one or more characteristics of the battery and to control one or more operating parameters of one or more of the compressor, the condenser, and the evaporator based on the one or more characteristics of the battery.

In other features, the one or more characteristics of the battery include a voltage of the battery, a current supplied by the battery, an internal resistance of the battery, and a state of charge of the battery. The one or more operating parameters include a speed of the motor of the compressor, use of refrigerant injection by the compressor, a speed of a condenser fan, and a speed of an evaporator fan.

In other features, the control module controls the one or more operating parameters in a predetermined order.

In other features, the control module reduces the speed of the motor of the compressor based on the one or more characteristics of the battery.

In other features, the control module reduces a speed of a condenser fan based on the one or more characteristics of the battery.

In other features, the control module stops use of refrigerant injection by the compressor based on the one or more characteristics of the battery.

In other features, the control module sequentially turns off the compressor and a condenser fan and then reduces a speed of an evaporator fan based on the one or more characteristics of the battery.

In other features, in response to the one or more characteristics of the battery being less than or equal to a predetermined threshold, the control module sequentially reduces a speed of the motor of the compressor, reduces a speed of a condenser fan, stops use of refrigerant injection by the compressor, and reduces a speed of an evaporator fan after turning off the compressor and the condenser fan.

In other features, the control module determines a state of charge of the battery and in response to the state of charge being less than or equal to a predetermined threshold, the control module sequentially reduces a speed of the motor of the compressor, reduces a speed of a condenser fan, stops use of refrigerant injection by the compressor, and reduces a speed of an evaporator fan after turning off the compressor and the condenser fan.

In other features, the control module monitors voltage and current supplied by the battery, estimates an internal resistance of the battery based on the voltage and current, and estimates a state of charge of the battery based on the voltage and the internal resistance. In response to the state of charge being less than or equal to a predetermined threshold, the control module sequentially reduces a speed of the motor of the compressor, reduces a speed of a condenser fan, stops use of refrigerant injection by the compressor, and reduces a speed of an evaporator fan after turning off the compressor and the condenser fan.

In other features, the control module monitors a voltage of the battery, estimates an internal resistance of the battery, and indicates whether to service or replace the battery based on the voltage and the internal resistance of the battery.

In other features, the control module comprises a monitoring module to monitor voltage of the battery when the compressor is off, and an adjusting module to adjust one or more of the operating parameters in response to the voltage of the battery being less than or equal to a predetermined threshold.

In other features, the control module comprises a monitoring module, an estimating module, a comparing module, a predicting module, and an adjusting module. The monitoring module is configured to monitor voltage of the battery and current supplied by the battery when the refrigeration system is operating. The estimating module is configured to estimate an internal resistance of the battery based on the voltage and the current. The comparing module is configured to compare the voltage and the internal resistance to respective values measured when the compressor is turned off and to respective values measured when the compressor is operating at full capacity. The predicting module is configured to predict a state of charge of the battery based on the comparisons. The adjusting module is configured to adjust the one or more operating parameters based on the state of charge of the battery.

In other features, the control module comprises a monitoring module, an estimating module, a comparing module, and a diagnosing module. The monitoring module is configured to monitor voltage of the battery and current supplied by the battery when the refrigeration system is operating. The estimating module is configured to estimate an internal resistance of the battery based on the voltage and the current. The comparing module is configured to compare the voltage and the internal resistance to respective values stored in the control module during prior operations of the refrigeration system. The diagnosing module is configured to indicate whether to service or replace the battery based on the comparison.

In other features, the diagnosing module indicates that the battery needs servicing or replacing in response to the internal resistance increasing or the voltage decreasing by respective predetermined amounts relative to the stored values.

In other features, the one or more sources of power include power from a utility received via a receptacle.

In other features, the receptacle is configured to receive power from the utility via a power cord connected between the receptacle and a wall outlet or charger of a building.

In still other features, a method for operating a refrigeration system for a vehicle is provided, where the refrigeration system for the vehicle includes a compressor in fluid communication with a condenser and an evaporator, where the compressor includes a variable speed motor and employs capacity modulation using refrigerant injection, and where the condenser and the evaporator include variable speed fans. The method comprises monitoring one or more characteristics of a battery supplying power to the refrigeration system, the battery being charged by one or more sources of power including the vehicle. The method further comprises controlling one or more operating parameters of one or more of the compressor, the condenser, and the evaporator based on the one or more characteristics of the battery.

In other features, the one or more characteristics of the battery include a voltage of the battery, a current supplied by the battery, an internal resistance of the battery, and a state of charge of the battery. The one or more operating parameters include a speed of the motor of the compressor, use of refrigerant injection by the compressor, a speed of a condenser fan, and a speed of an evaporator fan.

In other features, the method further comprises controlling the one or more operating parameters in a predetermined order.

In other features, the method further comprises reducing the speed of the motor of the compressor based on the one or more characteristics of the battery.

In other features, the method further comprises reducing a speed of a condenser fan based on the one or more characteristics of the battery.

In other features, the method further comprises stopping use of refrigerant injection by the compressor based on the one or more characteristics of the battery.

In other features, the method further comprises sequentially turning off the compressor and a condenser fan and then reducing a speed of an evaporator fan based on the one or more characteristics of the battery.

In other features, the method further comprises in response to the one or more characteristics of the battery being less than or equal to a predetermined threshold, sequentially reducing a speed of the motor of the compressor, reducing a speed of a condenser fan, stopping use of refrigerant injection by the compressor, and reducing a speed of an evaporator fan after turning off the compressor and the condenser fan.

In other features, the method further comprises determining a state of charge of the battery, and in response to the state of charge being less than or equal to a predetermined threshold, sequentially reducing a speed of the motor of the compressor, reducing a speed of a condenser fan, stopping use of refrigerant injection by the compressor, and reducing a speed of an evaporator fan after turning off the compressor and the condenser fan.

In other features, the method further comprises monitoring voltage and current supplied by the battery, estimating an internal resistance of the battery based on the voltage and current, and estimating a state of charge of the battery based on the voltage and the internal resistance. The method further comprises in response to the state of charge being less than or equal to a predetermined threshold, sequentially reducing a speed of the motor of the compressor, reducing a speed of a condenser fan, stopping use of refrigerant injection by the compressor, and reducing a speed of an evaporator fan after turning off the compressor and the condenser fan.

In other features, the method further comprises monitoring a voltage of the battery, estimating an internal resistance of the battery, and indicating whether to service or replace the battery based on the voltage and the internal resistance of the battery.

In other features, the method further comprises monitoring voltage of the battery when the compressor is off, and adjusting one or more of the operating parameters in response to the voltage of the battery being less than or equal to a predetermined threshold.

In other features, the method further comprises monitoring voltage of the battery and current supplied by the battery when the refrigeration system is operating, and estimating an internal resistance of the battery based on the voltage and the current. The method further comprises comparing the voltage and the internal resistance to respective values measured when the compressor is turned off and to respective values measured when the compressor is operating at full capacity. The method further comprises predicting a state of charge of the battery based on the comparisons, and adjusting the one or more operating parameters based on the state of charge of the battery.

In other features, the method further comprises monitoring voltage of the battery and current supplied by the battery when the refrigeration system is operating, and estimating an internal resistance of the battery based on the voltage and the current. The method further comprises comparing the voltage and the internal resistance to respective values stored during prior operations of the refrigeration system, and indicating whether to service or replace the battery based on the comparison.

In other features, the method further comprises indicating that the battery needs servicing or replacing in response to the internal resistance increasing or the voltage decreasing by respective predetermined amounts relative to the stored values.

In other features, the one or more sources of power include power from a utility received via a receptacle.

In other features, the method further comprises receiving power from the utility via a power cord connected between the receptacle and a wall outlet or charger of a building.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4A includes a functional block diagram of a portion of an example refrigeration system including multiple eutectic plates.

In the drawings, reference numbers may be reused to identify similar and/or identical elements.

DETAILED DESCRIPTION

The present disclosure relates to systems and methods for predicting and monitoring life a battery pack used in refrigeration systems in a vehicle. Battery voltage and current are used to estimate battery internal resistance. Battery voltage and the estimated resistance are compared to known full load and no-load values. A state of charge of the battery pack is predicted based on the comparisons. One or more system parameters are adjusted based on the state of charge of the battery pack to ensure adequate runtime and prevent excessive battery discharge. Additionally, the present values of the voltage and the estimated internal resistance of the battery pack are compared to respective historical readings to determine whether the present values are similar to historical values. The user is notified that the batteries need to be serviced or replaced if the present values are different from the historical values by more than predetermined amounts.

The present disclosure is organized as follows. Initially, a refrigeration system of a vehicle according to the present disclosure is described with reference to FIGS. 1-5. Subsequently, the aspects of the present disclosure relating to predicting and monitoring battery life are described in detail with reference to FIGS. 6 and 7.

Figure 1A:
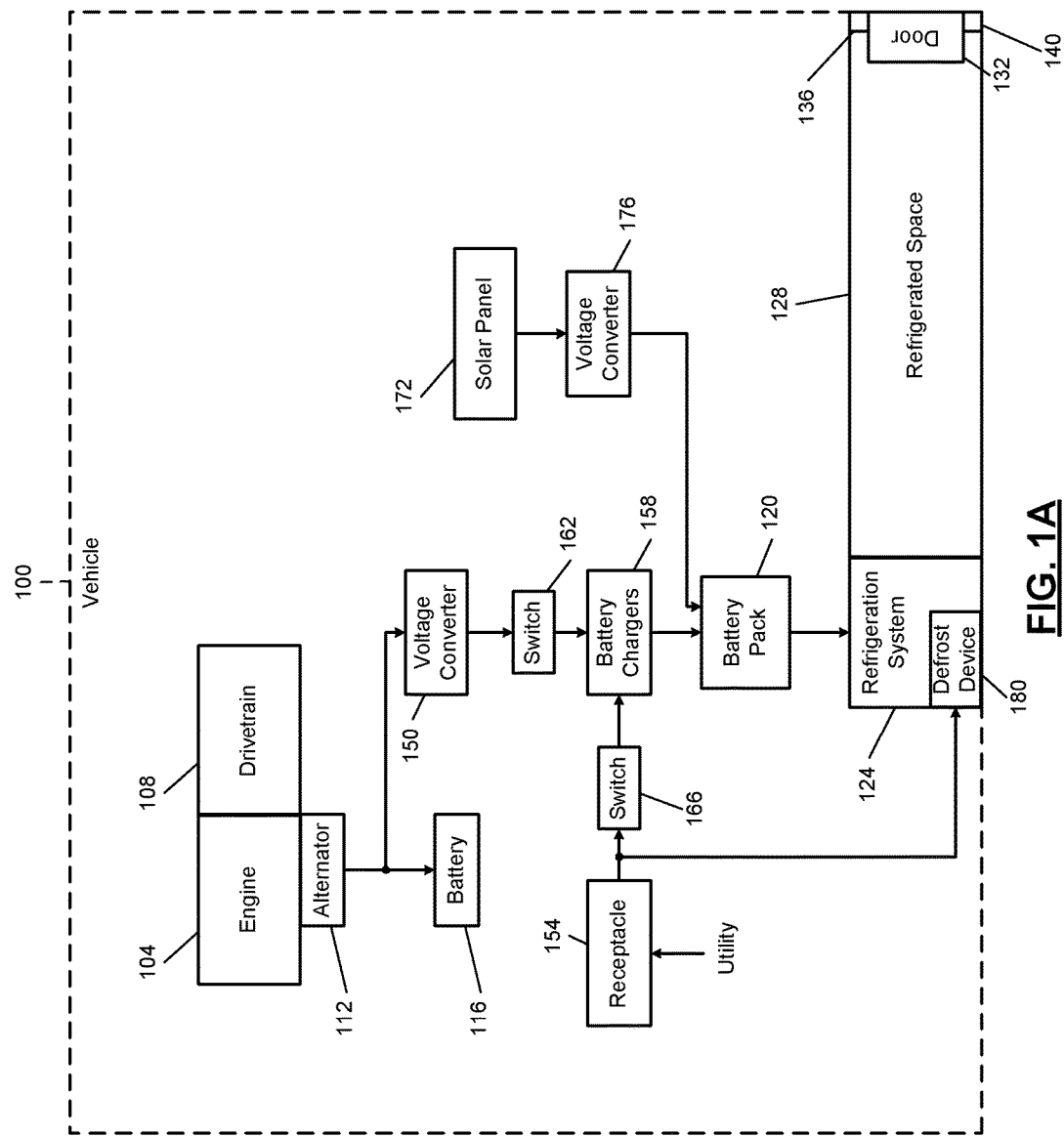
FIGS. 1A and 1B are functional block diagrams of example vehicle systems.
Figure 1B:
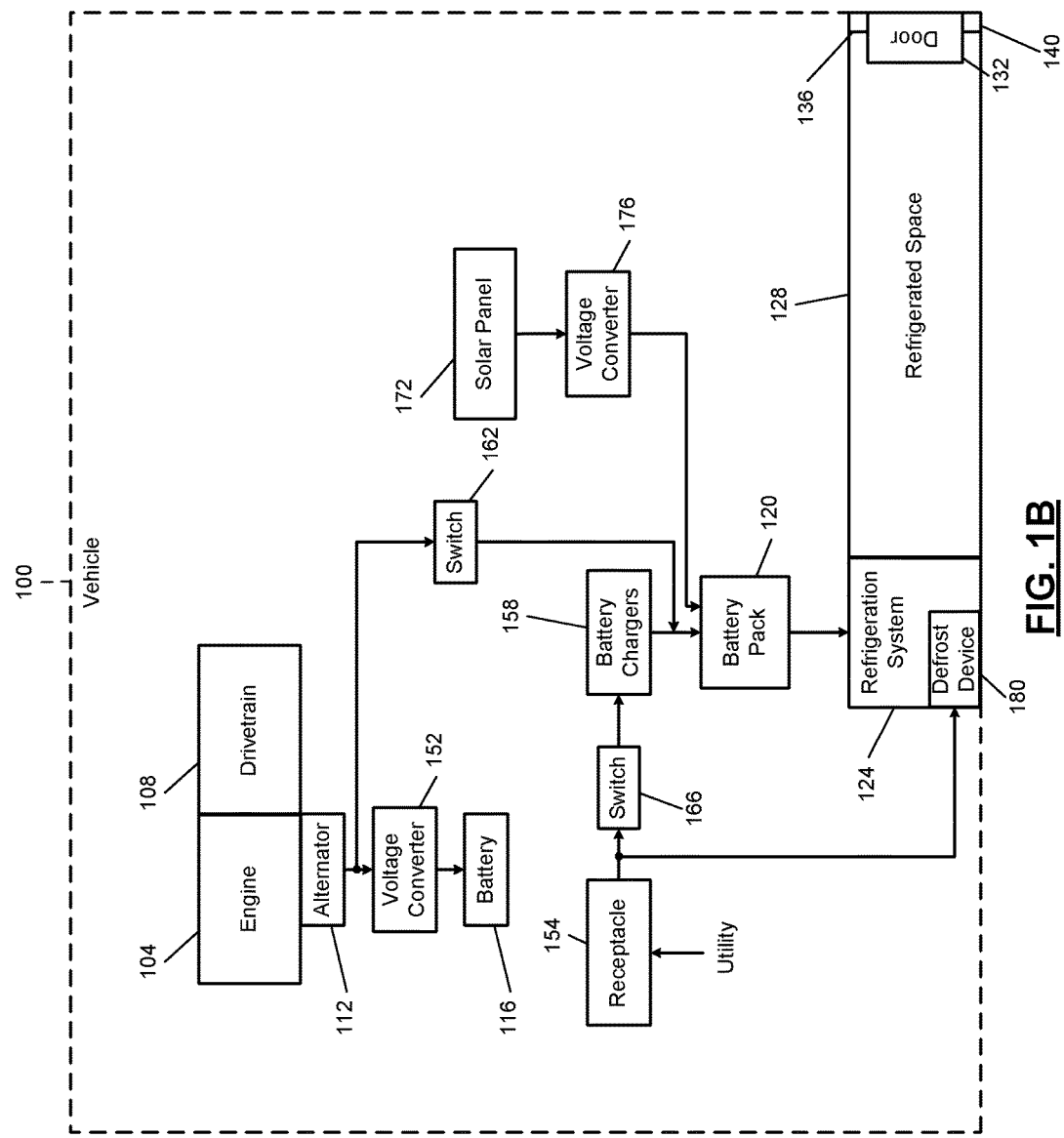

FIGS. 1A and 1B are functional block diagrams of example systems of a vehicle 100. The vehicle 100 includes an internal combustion engine 104 that combusts air and fuel within cylinders to generate propulsion torque for the vehicle 100. The engine 104 may combust, for example, gasoline, diesel fuel, natural gas, and/or one or more other types of fuel. The engine 104 outputs torque to a drivetrain 108. The drivetrain 108 transfers torque to two or more wheels of the vehicle. While the example of a wheeled vehicle is provided, the present application is not limited to vehicles having wheels and is also applicable to water and/or air based vehicles.

An electrical source 112 is driven by the engine 104 and converts mechanical energy of the engine 104 into electrical energy to charge a battery 116. The electrical source 112 may include an alternator, a generator, and/or another type of device that converts mechanical energy of the engine 104 into electrical energy. While the example of a single electrical source is provided, multiple or zero electrical sources driven by the engine 104 may be included. The electrical source 112 may be, for example, a 12 V alternator (e.g., in the example of FIG. 1A) and/or a 48 V alternator (e.g., in the example of FIG. 1B).

The vehicle 100 also includes a battery pack 120. For example only, the battery pack 120 may be a 48 Volt (V) direct current (DC) battery pack, although another suitable battery pack may be used. The battery pack 120 may include two or more individual batteries connected together or may include one battery. For example, in the case of a 48 V battery pack, the battery pack 120 may include four 12 V batteries connected in series. The batteries may be connected such that a lower voltage, such as 12 V, 24 V, and/or 36 V can also be obtained from one, two, or three of the batteries.

Figure 2A:
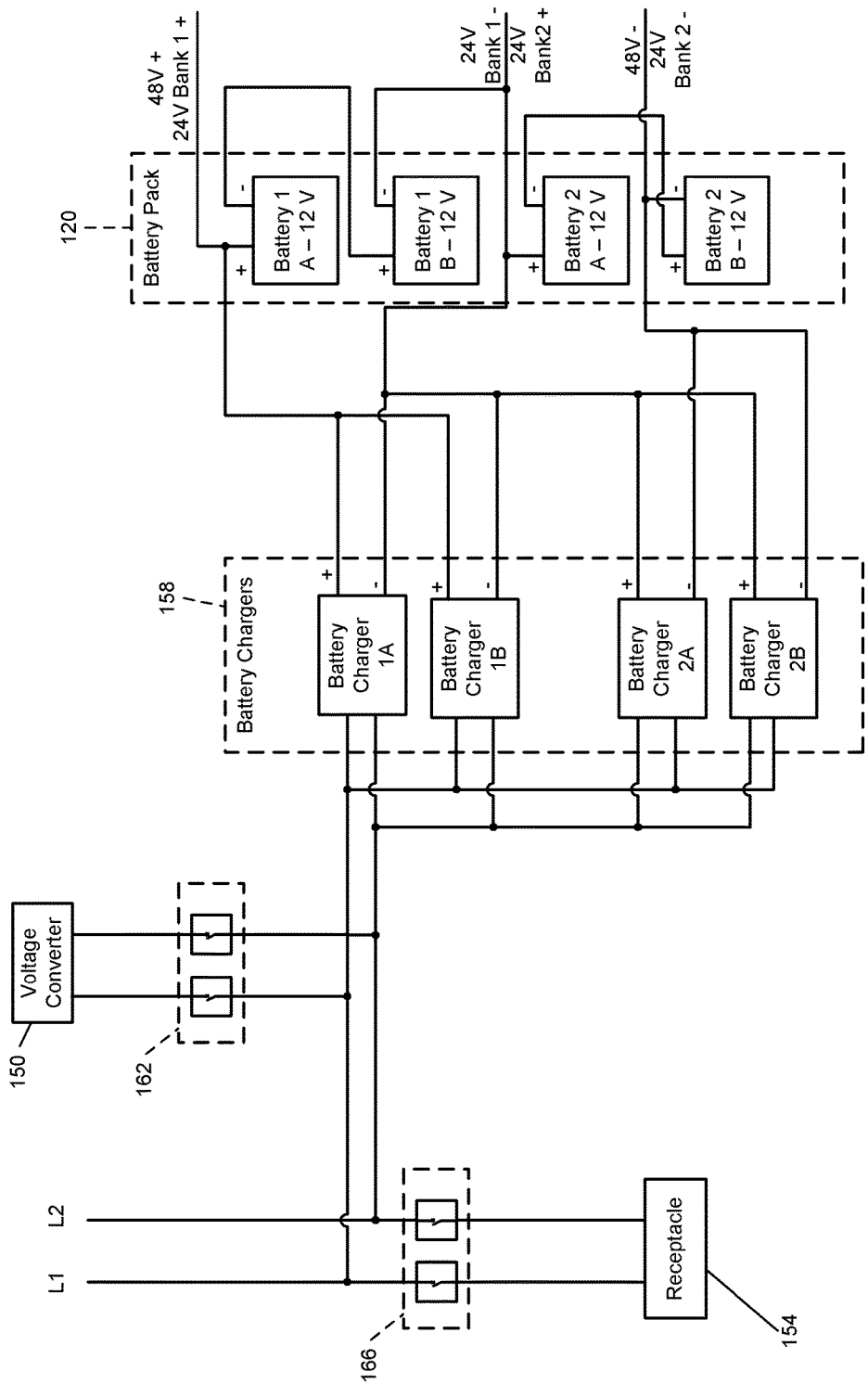
FIGS. 2A and 2B are schematics including a battery pack for a refrigeration system of a vehicle and example charging systems for charging the battery pack.
Figure 2B:
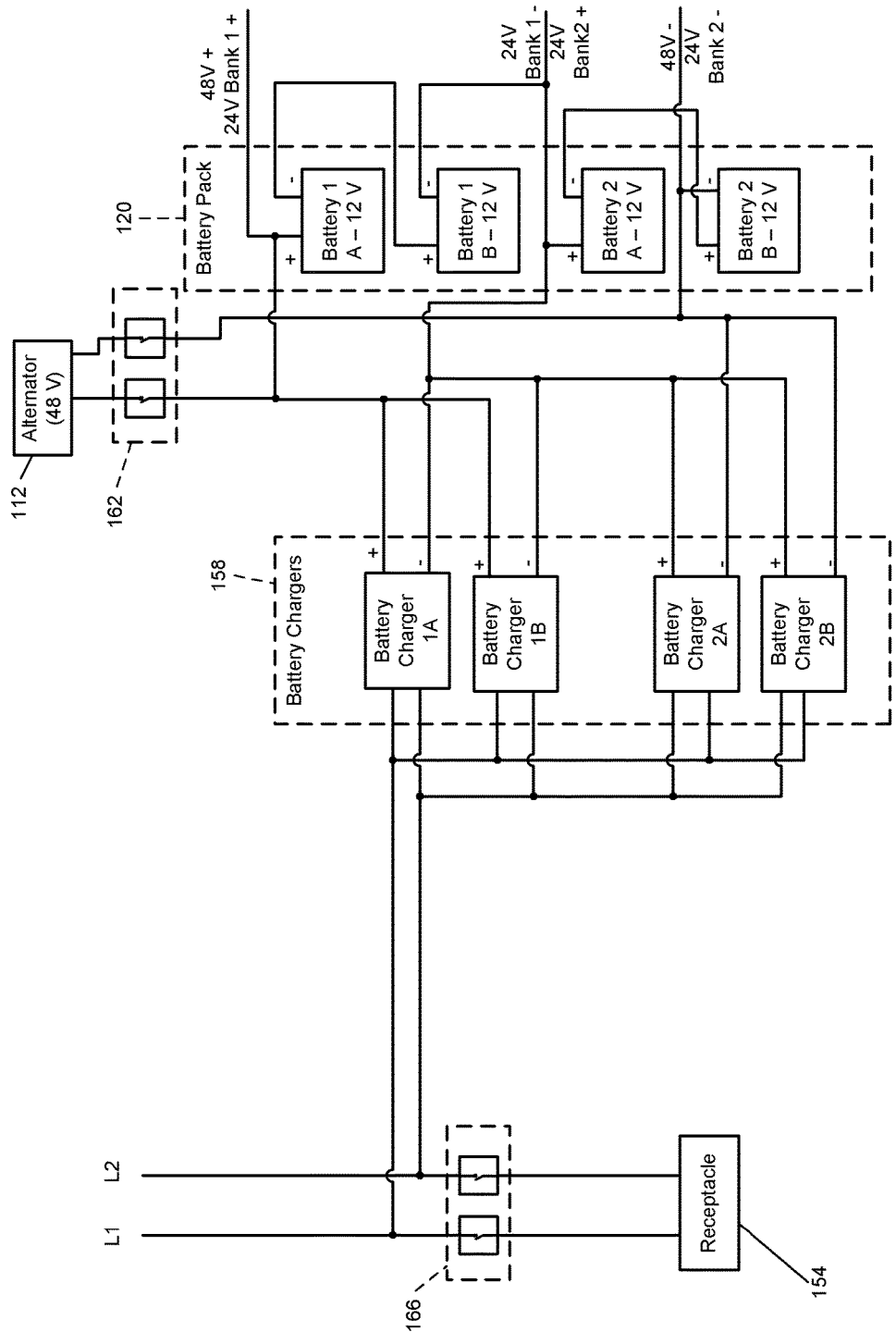

FIGS. 2A and 2B are schematics including examples of the battery pack 120 for a refrigeration system of a vehicle and example charging systems. In the examples of FIGS. 2A and 2B, the battery pack 120 includes four individual 12 V batteries connected in series. The batteries are arranged in two banks (A and B), each bank having two individual 12 V batteries (batteries 1 and 2) connected in series, to provide two 24 V reference potentials.

Referring back to FIGS. 1A and 1B, the battery pack 120 supplies power to a refrigeration system 124. The refrigeration system 124 cools a refrigerated space 128. The refrigerated space 128 may be one refrigerated space that is cooled based on a setpoint temperature. Alternatively, the refrigerated space 128 may be divided (e.g., physically) into multiple refrigerated spaces that may be cooled based on respective setpoint temperatures. For example, a first portion of the refrigerated space 128 may be cooled based on a first setpoint temperature (e.g., for refrigerated items) and a second portion of the refrigerated space 128 may be cooled based on a second setpoint temperature (e.g., for frozen items) that is less than the first setpoint temperature. One example of such a vehicle includes a truck for transporting perishable food items between locations. The refrigerated space(s) may be cooled with a closed loop control system based on temperature(s) within the refrigerated space(s) and the set point temperature(s), respectively.

The vehicle 100 includes a door 132 that provides access to the refrigerated space 128, for example, for loading and unloading of contents of the refrigerated space 128. While the example of one door is provided, the vehicle 100 may include two or more doors. Some vehicles include fourteen (14) or more doors.

An unlock actuator 136 and a lock actuator 140 may unlock and lock the door 132, respectively. The unlock and lock actuators 136 and 140 may, for example, slide a pin out of and into a receiver to lock and unlock the door 132, respectively. An unlock actuator and a lock actuator may be provided with each door to the refrigerated space in various implementations.

A control module (discussed further below) of the refrigeration system 124 may actuate the unlock actuator 136 to unlock the door 132 (and the other doors to the refrigerated space 128) in response to user input to unlock doors of a passenger cabin of the vehicle 100. The control module may actuate the lock actuator 140 to lock the door 132 (and the other doors to the refrigerated space 128) in response to user input to lock the doors of the passenger cabin of the vehicle 100. User input to lock and unlock the doors of the passenger cabin may be provided, for example, via a wireless key fob, a mobile device (e.g., cell phone, tablet, or other handheld device), a remote computer system, and/or one or more lock/unlock switches accessible from within the passenger cabin of the vehicle 100.

The battery pack 120 can be charged using multiple different power sources. For example, in the example of FIG. 1A, the vehicle 100 includes a voltage converter 150 that converts power output by the electrical source 112 (e.g., 12 V) into power for charging the battery pack 120. The voltage converter 150 may convert the DC output of the electrical source 112 into, for example, 240 V alternating current (AC). Since the electrical source 112 is driven by rotation of the engine 104, the electrical source 112 may be used to charge the battery pack 120 when the engine 104 is running.

While the electrical source 112 is shown as providing power for charging both the battery 116 and the battery pack 120, a second electrical source may be used to convert power of the engine 104 into electrical power for the battery pack 120. In that case, the electrical source 112 may be used to charge the battery 116. In various implementations, the voltage converter 150 and a switch 162 may be omitted, and the engine 104 may not be used to charge the battery pack 120. The battery pack 120 may instead be charged via one or more other power sources, such as those discussed further below.

As another example, in the example of FIG. 1B, the electrical source 112 may charge the battery pack 120. In this example, a voltage converter 152 may convert the power output by the electrical source 112 (e.g., 48 V) into power for charging the battery 116. The voltage converter 152 may convert the DC output of the electrical source 112 into, for example, 12 V for the battery 116. Alternatively, however, another electrical source may be used to charge the battery 116. In various implementations, an (engine driven) electrical source for charging the battery pack 120 may be omitted.

The battery pack 120 can be charged using power from a utility received via a receptacle 154. The receptacle 154 is configured to receive AC or DC power. For example, the receptacle 154 may receive AC power from a utility via a power cord (e.g., an extension cord) connected between the receptacle 154 and a wall outlet or charger of a building. The receptacle 154 may be, for example, a single phase 110/120 or 208/240 V AC receptacle or a 3-phase 208/240 V AC receptacle. In various implementations, the vehicle 100 may include both a 110/120 V AC receptacle and a 208/240 V AC receptacle. While the example of the receptacle 154 receiving AC power is provided, the receptacle 154 may alternatively receive DC power from via a power cord. In various implementations, the vehicle 100 may include one or more AC receptacles and/or one or more DC receptacles. Power received from a utility via the receptacle 154 will be referred to as shore power.

The vehicle 100 also includes one or more battery chargers 158. The battery chargers 158 charge the batteries of the battery pack 120 using shore power received via the receptacle 154 (or power output by the voltage converter 150 in the examples of FIGS. 1A and 2A). When the receptacle 154 is connected to shore power, the switch 162 opens (or is opened) to isolate power from the electrical source 112. While the switch 162 is shown illustratively as one switch, the switch 162 may include one, two, or more than two switching devices (e.g., normally closed or normally open relays). In the examples of FIGS. 2A and 2B, the switch 162 is illustrated as including two relays, one relay for each power line.

When the receptacle 154 is connected to shore power and the ignition system of the vehicle 100 is OFF, a switch 166 closes (or is closed) to relay power from the receptacle 154 to the battery chargers 158, and the battery chargers 158 charge the batteries using shore power. While the switch 166 is also shown illustratively as one switch, the switch 166 may include one, two, or more than two switching devices (e.g., normally closed or normally open relays). In the example of FIGS. 2A and 2B, the switch 166 is illustrated as including two relays, one relay for each power line.

When the ignition system of the vehicle 100 is ON, the switch 166 isolates the receptacle 154 from the battery chargers 158. In the examples of FIGS. 1A and 2A, when the ignition system of the vehicle 100 is ON (such that the engine 104 is running and the voltage converter 150 is outputting power to charge the battery pack 120), the switch 162 connects the voltage converter 150 to the battery chargers 158. The battery chargers 158 can then charge the batteries of the battery pack 120 using power output by the voltage converter 150. In the examples of FIGS. 1B and 2B, when the ignition system of the vehicle 100 is ON (such that the engine 104 is running and the electrical source 112 is outputting power), the switch 162 connects the electrical source 112 to the battery pack 120 so the electrical source 112 charges the battery pack 120.

One battery charger may be provided for each battery of the battery pack 120. Two or more battery chargers may be connected in series and/or parallel in various implementations. Each battery charger may convert input power (e.g., shore power or power output by the voltage converter 150) into, for example, 24 V, 40 amp (A) DC power for charging. For example only, the battery chargers 158 may include one model SEC-2440 charger, manufactured by Sam lex America Inc., of Burnaby, BC, Canada. In the examples of FIGS. 2A and 2B, two groups of two 24 V, 40 A battery chargers are connected to provide a 48 V, 80 A output for battery charging. While the example of battery chargers having a 24 V, 40 A output is provided, battery chargers having another output may be used, such as one 12 V charger connected to each battery. The battery chargers 158 may also monitor the individual batteries and control application of power to the respective batteries to prevent overcharging.

The vehicle 100 may optionally include a solar panel 172. The solar panel 172 converts solar energy into electrical energy. While the example of one solar panel is provided, multiple solar panels may be used. A voltage converter 176 converts power output by the solar panel 172 and charges the battery pack 120.

As discussed further below, the refrigeration system 124 includes one or more eutectic plates. The eutectic plate(s) are cooled when the vehicle 100 is connected to shore power. When the vehicle 100 is later disconnected from shore power (e.g., for delivery of contents of the refrigerated space 128), the eutectic plate(s) can be used to cool the refrigerated space 128 via power from the battery pack 120. The eutectic plate(s) can also be cooled by the refrigeration system 124 when the vehicle 100 is disconnected from shore power.

By charging the battery pack 120 when the vehicle 100 is connected to shore power (and/or via the solar panel 172), use of the engine 104 to generate power to operate the refrigeration system 124 when the vehicle 100 is disconnected from shore power may be minimized or eliminated. This may decrease fuel consumption (and increase fuel efficiency) of the engine 104 and the vehicle 100.

A defrost device 180 may be used to defrost the eutectic plate(s) when the vehicle 100 is connected to shore power. One example of the defrost device 180 includes a resistive heater that warms air circulated over, around, and/or through the eutectic plate(s), such as by one or more fans. Another example of the defrost device 180 includes a resistive heater that warms a fluid (e.g., a glycol solution) that is circulated over, around, and/or through the eutectic plate(s), such as by one or more pumps. In this way, heat from the warm air or warm fluid defrosts the eutectic plate(s).

Figure 3:
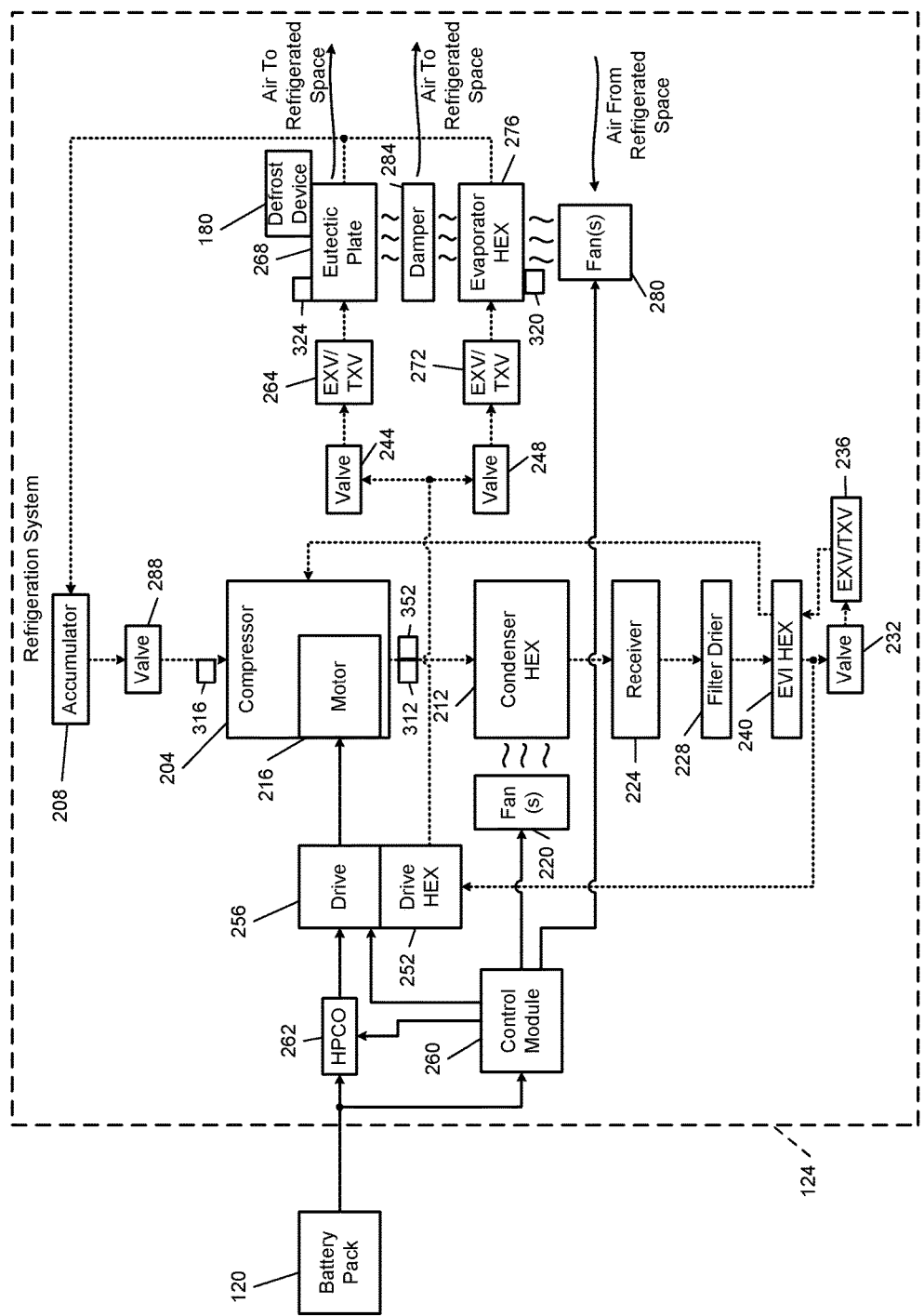
FIG. 3 is a functional block diagram of an example implementation of a refrigeration system of a vehicle including a eutectic plate and an evaporator system.

FIG. 3 includes a functional block diagram of an example implementation of the refrigeration system 124. In the example of FIG. 3, dotted lines indicate refrigerant flow, while solid lines indicate electrical connections. In various implementations, some, all, or none of the components of the refrigeration system 124 may be located within the refrigerated space 128.

A compressor 204 receives refrigerant vapor from an accumulator 208 via a suction line of the compressor 204. The accumulator 208 collects liquid refrigerant to minimize liquid refrigerant flow to the compressor 204. The compressor 204 compresses the refrigerant and provides pressurized refrigerant in vapor form to a condenser heat exchanger (HEX) 212. The compressor 204 includes an electric motor 216 that drives a pump to compress the refrigerant. For example only, the compressor 204 may include a scroll compressor, a reciprocating compressor, or another type of refrigerant compressor. The electric motor 216 may include, for example, an induction motor, a permanent magnet motor (brushed or brushless), or another suitable type of electric motor. In various implementations, the electric motor 216 may be a brushless permanent magnet (BPM) motor, for example, due to BPM motors being more efficient than other types of electric motors.

All or a portion of the pressurized refrigerant is converted into liquid form within the condenser HEX 212. The condenser HEX 212 transfers heat away from the refrigerant, thereby cooling the refrigerant. When the refrigerant vapor is cooled to a temperature that is less than a saturation temperature of the refrigerant, the refrigerant transitions into liquid (or liquefied) form. One or more condenser fans 220 may be implemented to increase airflow over, around, and/or through the condenser HEX 212 and increase the rate of heat transfer away from the refrigerant.

Refrigerant from the condenser HEX 212 is delivered to a receiver 224. The receiver 224 may be implemented to store excess refrigerant. In various implementations, the receiver 224 may be omitted. A filter drier 228 may be implemented to remove moister and debris from the refrigerant. In various implementations, the filter drier 228 may be omitted.

When an enhanced vapor injection (EVI) valve 232 is open, a portion of the refrigerant may be expanded to vapor form by an expansion valve 236 and provided to an EVI HEX 240. The EVI valve 232 may be, for example, a solenoid valve or another suitable type of valve.

The EVI HEX 240 may be a counter flow plate HEX and may superheat the vapor refrigerant from the EVI valve 232. Vapor refrigerant from the EVI HEX 240 may be provided to the compressor 204, such as at a midpoint within a compression chamber of the compressor 204. EVI may be performed, for example, to increase capacity and increase efficiency of the refrigeration system 124. The EVI valve 232 may include a thermostatic expansion valve (TXV) or an electronic expansion valve (EXV).

The refrigerant not flowing through the EVI valve 232 is circulated to a plate control valve 244 and an evaporator control valve 248. The plate control valve 244 may be, for example, a solenoid valve or another suitable type of valve. The evaporator control valve 248 may be, for example, a solenoid valve or another suitable type of valve.

Before flowing to the plate control valve 244 and the evaporator control valve 248, the refrigerant may flow through a drive HEX 252. The drive HEX 252 draws heat away from a drive 256 and transfers heat to refrigerant flowing through the drive HEX 252. While the example of the drive HEX 252 being liquid (refrigerant) cooled is provided, the drive 256 may additionally or alternatively be air cooled. Air cooling may be active (e.g., by a fan) or passive (e.g., by conduction and convection).

The drive 256 controls application of power to the motor 216 from the battery pack 120. For example, the drive 256 may control application of power to the motor 216 based on a speed command from a control module 260. Based on the speed command, the drive 256 may generate three-phase AC power (e.g., 208/240 V AC) and apply the three-phase AC power to the motor 216. The drive 256 may set one or more characteristics of the three-phase AC power based on the speed command, such as frequency, voltage, and/or current. For example only, the drive 256 may be a variable frequency drive (VFD). In various implementations, one or more electromagnetic interference (EMI) filters may be implemented between the battery pack 120 and the drive 256.

The control module 260 may set the speed command to a plurality of different possible speeds for variable speed operation of the motor 216 and the compressor 204. The control module 260 and the drive 256 may communicate, for example, using RS485 Modbus or another suitable type of communication including, but not limited to, controller area network (CAN) bus or analog signaling (e.g., 0-10V signals).

A high pressure cut off (HPCO) 262 may be implemented to disconnect the drive 256 from power and disable the motor 216 when the pressure of refrigerant output by the compressor 204 exceeds a predetermined pressure. The control module 260 may also control operation of the compressor 204 based on a comparison of the pressure of refrigerant output by the compressor 204. For example, the control module 260 may shut down or reduce the speed of the compressor 204 when the pressure of refrigerant output by the compressor is less than a second predetermined pressure that is less than or equal to the predetermined pressure used by the HPCO 262.

When the plate control valve 244 is open, refrigerant may be expanded to vapor form by an expansion valve 264 and provided to a eutectic plate 268. The vapor refrigerant cools the eutectic plate 268 and a solution within the eutectic plate 268. For example only, the solution may be a solution including one or more salts. The solution may have a freezing point temperature of, for example, approximately 12 degrees Fahrenheit or another suitable freezing point temperature. The solution of the eutectic plate 268 may be selected, for example, based on the items typically cooled within the refrigerated space 128. The expansion valve 264 may include a TXV or may be an EXV.

The eutectic plate 268 is located within the refrigerated space 128 and cools the refrigerated space 128. By freezing the solution within the eutectic plate 268, the eutectic plate 268 can be used to cool the refrigerated space for a period of time after the freezing, such as while the vehicle 100 is transporting items within the refrigerated space 128.

When the evaporator control valve 248 is open, refrigerant may be expanded to vapor form by an expansion valve 272 and provided to an evaporator HEX 276. The expansion valve 272 may include a TXV or may be an EXV. Like the eutectic plate 268, the evaporator HEX 276 cools the refrigerated space 128. More specifically, the vapor refrigerant within the evaporator HEX 276 transfers heat away (i.e., absorbs heat) from air within the refrigerated space 128.

One or more evaporator fans 280 may draw air from the refrigerated space 128. The evaporator fan(s) 280 may increase airflow over, around, and/or through the evaporator HEX 276 and the eutectic plate 268 to increase the rate of heat transfer away from (i.e., cooling of) the air within the refrigerated space 128. A damper door 284 may be implemented to allow or block airflow from the evaporator fan(s) 280 to the eutectic plate 268. For example, when the damper door 284 is open, the evaporator fan(s) 280 may circulate air past the evaporator HEX 276 and the eutectic plate 268. When the damper door 284 is closed, the damper door 284 may block airflow from the evaporator fan(s) 280 to the eutectic plate 268, and the evaporator fan(s) 280 may circulate air over, around, and/or through the evaporator HEX 276. While the example of the damper door 284 is provided, another suitable actuator may be used to allow/prevent airflow from the evaporator fan(s) 280 to the eutectic plate 268. Alternatively, one or more fans may be provided with the evaporator HEX 276, and one or more fans may be provided with the eutectic plate 268. Refrigerant flowing out of the eutectic plate 268 and the evaporator HEX 276 may flow back to the accumulator 208. Air cooled by the evaporator HEX 276 and the eutectic plate 268 flows to the refrigerated space to cool the refrigerated space 128. While separate cooled air paths are illustrated in the example of FIG. 3, air flowing out of the eutectic plate 268 may be combined with air flowing out of the evaporator HEX 276 before the cooled air is output to cool the refrigerated space 128. Curved lines in FIG. 3 are illustrative of air flow.

The refrigeration system 124 may also include a compressor pressure regulator (CPR) valve 288 that regulates pressure of refrigerant input to the compressor 204 via the suction line. For example, the CPR valve 288 may be closed to limit pressure into the compressor 204 during startup of the compressor 204. The CPR valve 288 may be an electronically controlled valve (e.g., a stepper motor or solenoid valve), a mechanical valve, or another suitable type of valve. In various implementations, the CPR valve 288 may be omitted.

The example of one eutectic plate and one evaporator HEX is provided in FIG. 3. However, the refrigeration system 124 may include more than one eutectic plate, such as two, three, four, five, six, or more eutectic plates. One expansion valve may be provided for each eutectic plate. FIG. 4A includes a functional block diagram of a portion of an example refrigeration system including multiple eutectic plates.

Figure 4B:
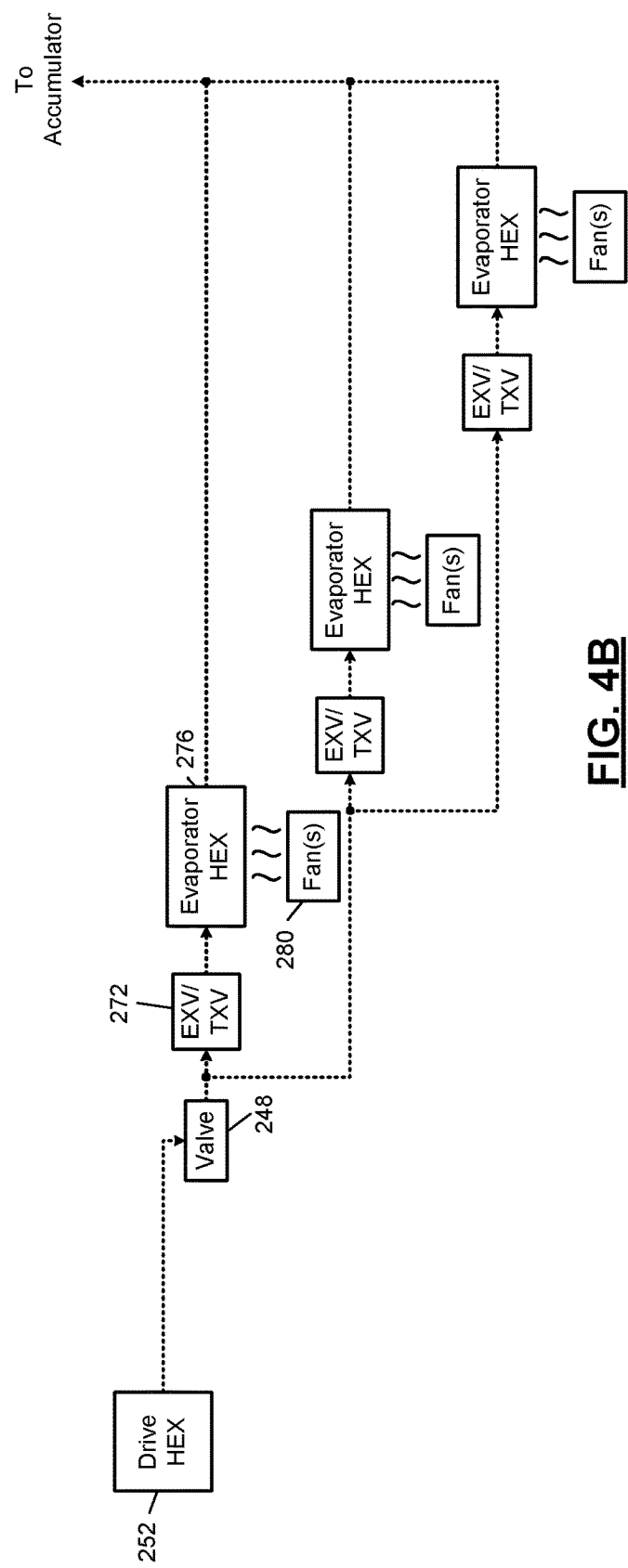
FIG. 4B includes a functional block diagram of a portion of an example refrigeration system including multiple evaporator systems.

Additionally or alternatively to having one or multiple eutectic plates, the refrigeration system 124 may include more than one evaporator HEX, such as two, three, four, five, six, or more evaporator HEXs. For example, different evaporator HEXs may be provided for different sections of the refrigerated space 128. One expansion valve and one or more evaporator fans may be provided for each evaporator HEX. FIG. 4B includes a functional block diagram of a portion of an example refrigeration system including three evaporator HEXs.

Some vehicles may include two or more refrigerated spaces, but only include an evaporator (or multiple) and a eutectic plate (or multiple) in one of the refrigerated spaces. A damper door or another suitable actuator may be provided to open and close the one refrigerated space having the evaporator and eutectic plate to and from one or more other refrigerated spaces not having an evaporator or a eutectic plate (i.e., not having any evaporators and not having any eutectic plates). The control module 260 may control opening and closing of such a damper door or actuator, for example, based on maintaining a temperature within the other refrigerated space based on a setpoint for that other refrigerated space.

Figure 5:
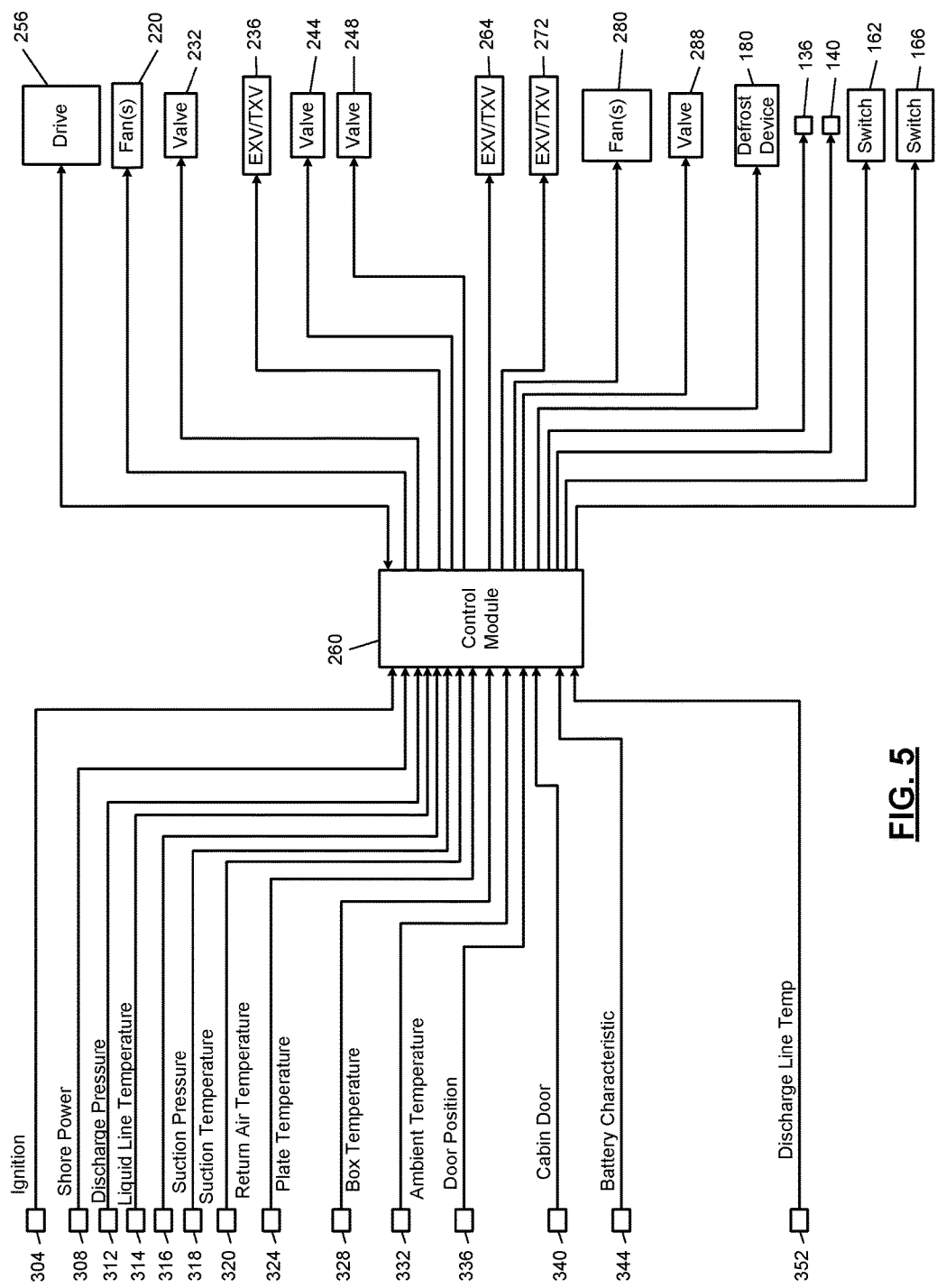
FIG. 5 includes a functional block diagram of an example system including a control module, sensors of the vehicle, and actuators of the vehicle.

FIG. 5 includes a functional block diagram of an example system including the control module 260, various sensors of the vehicle 100, and various actuators of the vehicle 100. The control module 260 receives various measured parameters and indications from sensors of the vehicle 100. The control module 260 controls actuators of the vehicle 100. As an example, the control module 260 may be an iPRO series control module (e.g., 100 series, 200 series, 4 DIN series, 10 DIN series) by Dixell S.r.l., located in Pieve d'Alpago (BL) Italy. One example is an iPRO IPG115D control module; however, the control module 260 may be another suitable type of control module.

An ignition sensor 304 indicates whether an ignition system of the vehicle 100 is ON or OFF. A driver may turn the ignition system of the vehicle 100 ON and start the engine 104, for example, by actuating an ignition key, button, or switch. The ignition system being ON may indicate that that a refrigeration system (discussed further below) is being or can be powered via a charging system powered by the engine 104. A driver may turn the ignition system of the vehicle 100 OFF and shut down the engine 104, for example, by actuating the ignition key, button, or switch.

A shore power sensor 308 indicates whether the vehicle 100 is receiving shore power via the receptacle 154.

A discharge pressure sensor 312 measures a pressure of refrigerant output by the compressor 204 (e.g., in the discharge line). The pressure of refrigerant output by the compressor 204 can be referred to as discharge pressure.

A liquid line temperature sensor 314 measures a temperature of liquid refrigerant output from the condenser HEX 212 (e.g., in the liquid line). The temperature of refrigerant output by the condenser HEX 212 can be referred to as liquid line temperature. The control module 260 may determine a subcooling value based on the liquid line temperature. The control module may determine a refrigerant charge level based on the subcooling value. While one example location of the liquid line temperature sensor 314 is shown, the liquid line temperature sensor 314 may be located at another location where liquid refrigerant is present in the refrigerant path from the condenser HEX 212 to the evaporator HEX 276 (and the eutectic plate 268).

A suction pressure sensor 316 measures a pressure of refrigerant input to the compressor 204 (e.g., in the suction line). The pressure of refrigerant input to the compressor 204 can be referred to as suction pressure.

A suction temperature sensor 318 measures a temperature of refrigerant input to the compressor 204 (e.g., in the suction line). The temperature of refrigerant input to the compressor 204 can be referred to as suction temperature. The control module 260 may determine a superheat value at the compressor 204. The control module 260 may detect and/or predict the presence of a liquid floodback condition based on the superheat value.

A return air temperature sensor 320 measures a temperature of air input to the evaporator HEX 276. The temperature of air input to the evaporator HEX 276 can be referred to as return air temperature (RAT). One return air temperature sensor may be provided for each set of one or more evaporator HEX and one or more eutectic plates.

A plate temperature sensor 324 measures a temperature of the eutectic plate 268. The temperature of the eutectic plate 268 can be referred to as a plate temperature.

A box temperature sensor 328 measures a temperature within the refrigerated space 128. The temperature within the refrigerated space 128 can be referred to as a box temperature. One or more box temperature sensors may be provided and measure a box temperature within each different portion of the refrigerated space 128.

An ambient temperature sensor 332 measures a temperature of ambient air at the location of the vehicle 100. This temperature can be referred to as ambient air temperature. In various implementations, the control module 260 may receive the ambient air temperature from an engine control module (ECM) that controls actuators of the engine 104.

A door position sensor 336 indicates whether the door 132 is closed or open. An indication that the door 132 is open may mean that the door 132 is at least partially open (i.e., not closed), while an indication that the door 132 is closed may mean that the door 132 is fully closed. One or more door position sensors may be provided for each door to the refrigerated space 128.

A cabin door sensor 340 indicates whether the doors of the passenger cabin have been commanded to be locked or unlocked. A driver may command unlocking and locking of the doors of the passenger cabin, for example, via a wireless key fob. As discussed above, the control module 260 may actuate the unlock actuator 136 to unlock the door(s) to the refrigerated space 128 when the driver commands unlocking of the doors passenger cabin. The control module 260 may actuate the lock actuator 140 to lock the door(s) to the refrigerated space 128 when the driver commands locking of the doors of the passenger cabin.

A battery sensor 344 measures a characteristic of a battery of the battery pack 120, such as voltage, current, and/or temperature. In various implementations, a voltage sensor, a current sensor, and/or a temperature sensor may be provided with each battery of the battery pack 120.

A discharge line temperature sensor 352 measures a temperature of refrigerant output by the compressor 204 (e.g., in the discharge line). The temperature of refrigerant output by the compressor 204 can be referred to as discharge line temperature (DLT). In various implementations, the discharge line temperature sensor 352 may provide the DLT to the drive 256, and the drive 256 may communicate the DLT to the control module 260.

Sensors described herein may be analog sensors or digital sensors. In the case of an analog sensor, the analog signal generated by the sensor may be sampled and digitized (e.g., by the control module 260, the drive 256, or another control module) to generate digital values, respectively, corresponding to the measurements of the sensor. In various implementations, the vehicle 100 may include a combination of analog sensors and digital sensors. For example, the ignition sensor 304, the shore power sensor 308, the door position sensor 336 may be digital sensors. The discharge pressure sensor 312, the suction pressure sensor 316, the return air temperature sensor 320, the plate temperature sensor 324, the box temperature sensor 328, the ambient temperature sensor 332, the battery sensor 344, and the discharge line temperature sensor 352 may be analog sensors.

As discussed further below, the control module 260 controls actuators of the refrigeration system 124 based on various measured parameters, indications, setpoints, and other parameters.

For example, the control module 260 may control the motor 216 of the compressor 204 via the drive 256. The control module 260 may control the condenser fan(s) 220. The condenser fan(s) 220 may be fixed speed, and the control module 260 may control the condenser fan(s) 220 to be either ON or OFF. Alternatively, the condenser fan(s) 220 may be variable speed, and the control module 260 may determine a speed setpoint for the condenser fan(s) 220 and control the condenser fan(s) 220 based on the speed setpoint, for example, by applying a pulse width modulation (PWM) signal to the condenser fan(s) 220.

The control module 260 may also control the EVI valve 232. For example, the control module 260 may control the EVI valve 232 to be open to enable EVI or closed to disable EVI. In the example of the expansion valve 236 being an EXV, the control module 260 may control opening of the expansion valve 236.

The control module 260 may also control the plate control valve 244. For example, the control module 260 may control the plate control valve 244 to be open to enable refrigerant flow through the eutectic plate 268 or closed to disable refrigerant flow through the eutectic plate 268. In the example of the expansion valve 264 being an EXV, the control module 260 may control opening of the expansion valve 264.

The control module 260 may also control the evaporator control valve 248. For example, the control module 260 may control the evaporator control valve 248 to be open to enable refrigerant flow through the evaporator HEX 276 or closed to disable refrigerant flow through the evaporator HEX 276. In the example of the expansion valve 272 being an EXV, the control module 260 may control opening of the expansion valve 272.

The control module 260 may receive a signal that indicates whether the HPCO 262 has tripped (open circuited). The control module 260 may take one or more remedial actions when the HPCO 262 has tripped, such as closing one, more than one, or all of the above mentioned valves and/or turning OFF one, more than one, or all of the above mentioned fans. The control module 260 may generate an output signal indicating that the HPCO 262 has tripped when the discharge pressure of the compressor 204 is greater than a predetermined pressure. The control module 260 may enable operation of the refrigeration system 124 after the HPCO 262 closes in response to the discharge pressure falling below than the predetermined pressure. In various implementations, the control module 260 may also require that one or more operating conditions be satisfied before enabling operation of the refrigeration system 124 after the HPCO 262 closes.

The control module may control the evaporator fan(s) 280. The evaporator fan(s) 280 may be fixed speed, and the control module 260 may control the evaporator fan(s) 280 to be either ON or OFF. Alternatively, the evaporator fan(s) 280 may be variable speed, and the control module 260 may determine a speed setpoint for the evaporator fan(s) 280 and control the evaporator fan(s) 280 based on the speed setpoint, for example, by applying a PWM signal to the evaporator fan(s) 280.

In the case of the CPR valve 288 being an electronic CPR valve, the control module 260 may also control the CPR valve 288. For example, the control module 260 may actuate the CPR valve 288 to limit the suction pressure during startup and later open the CPR valve 288.

The control module 260 may also control operation of the defrost device 180 by activating or deactivating the defrost device 180.

The control module 260 may also control the switches 162 and 166. For example, the control module 260 may switch the switch 162 from the closed state to the open state and switch the switch 166 from the open state to the closed state when the ignition system of the vehicle 100 is OFF and shore power is connected to the vehicle 100 via the receptacle 154. The control module 260 may switch the switch 162 from the open state to the closed state and switch the switch 166 from the closed state to the open state when the ignition system of the vehicle 100 is ON. This may be the case regardless of whether shore power is or is not connected to the vehicle 100. The switches 162 and 166 may be active switches, for example, so the control module 260 can ensure that both switches 162 and 166 are not both in the closed state at the same time.

In various implementations, the switches 162 and 166 may be passive devices configured to have opposite open and closed states based on whether shore power is connected to the vehicle 100. For example, the switch 166 may transition to the closed state and the switch 162 may transition to the open state when shore power is connected to the vehicle 100. The switch 166 may transition to the open state and the switch 162 may transition to the closed state when shore power is not connected to the vehicle 100.

As described above, in some small to midsized refrigerated vehicle systems (e.g., the refrigeration system 124), eutectic plate(s) (e.g., the eutectic plate 268) with active blower evaporator (e.g., evaporator HEX 276 with evaporator fan(s) 280) are used to provide cooling. Eutectic plates are filled with a fluid designed to freeze at a designated temperature. Typically these plates are selected to be either medium temperature (e.g., 35° F. Box) or low-temperature (e.g., 0° F. Box or lower). The temperature of these plates is pulled down typically at night when the vehicle (e.g., the vehicle 100) is not in service (e.g., parked at a depot). The refrigeration system typically does not run while the vehicle is in service.

Further, as described above, in some applications, the refrigeration system (e.g., the refrigeration system 124) is powered via batteries (e.g., the battery pack 120). The batteries are charged typically at night (e.g., by shore power) when the vehicle is not in service (e.g., parked at a depot). The batteries also charge when the vehicle engine is on (e.g., using power output from the alternator 112) (e.g., when the vehicle is making deliveries). The condensing unit runs as needed and depletes batteries when the vehicle engine (e.g., the engine 104) is off (e.g., when the vehicle is parked while making deliveries). In these applications it is important to manage battery charge levels during daily operation to ensure that the system is able to operate for an entire day. It is also important to have some indication regarding the life remaining in the batteries so that a replacement may be carried out at a proper time.

The present disclosure relates to a system and method for monitoring battery voltage and determining when battery replacement is needed in a variable speed refrigeration system (e.g., the refrigeration system 124). The proposed system and method utilizes a system controller (e.g., the control module 260) coupled to a variable speed drive (e.g., the drive 256) and a compressor (e.g., the compressor 204) to monitor and gauge battery charge (e.g., of the battery pack 120). This is done by communicating the drive input voltage and compressor current at various states to the system controller and comparing these values to a dedicated battery voltage monitoring input to the system controller (e.g., the input 344 to the control module 260 shown in FIG. 5 includes a voltage measurement from a voltage sensor provided with each battery of the battery pack 120 as explained above with reference to FIG. 5). The system controller interprets these readings as battery charge levels and battery health indication. The system controller then makes decisions regarding controlling the refrigeration system based on this monitored and gauged battery voltage.

The present disclosure relates to determining the battery charge in real time, and determining the battery health. Determining the battery charge level in real time allows the system controller to manage the operation of the refrigeration system to extend the battery life and to alert users (e.g., drivers) regarding low battery situations. Determining the battery health helps in providing the users an early indication if the battery needs service or replacement. These and other aspects of the present disclosure are described below in detail.

Briefly, in the system and method of the present disclosure, a no-load voltage of the battery pack 120 with the compressor 204 turned off is recorded. If the no-load voltage of the battery pack 120 is greater than or equal to a predetermined threshold (e.g., ≥50V for a 48V battery pack), the batteries in the battery pack 120 are considered to be fully charged. The refrigeration system 124 is started and operated normally. If the no-load voltage of the battery pack 120 is less than or equal to a predetermined threshold (e.g., ≤50V for a 48V battery pack), the batteries in the battery pack 120 are considered to be not fully charged. A notification is sent to alert the user (e.g., the driver of the vehicle) (e.g., by displaying a message on a display on or connected to the control module 260 or by using other audio/visual indicators or network communication that may be available in the refrigeration system 124) indicating that the batteries in the battery pack 120 are not fully charged or are overcharged. The operating parameters of the refrigeration system 124 (e.g., compressor speed, refrigerant injection for compressor cooling and capacity modulation, speeds of various fans, etc.) are adjusted based on the no-load voltage of the battery pack 120, and the refrigeration system 124 is started and operated normally.

In either case, the voltage and current supplied by the battery pack 120 to the refrigeration system 124 are read and recorded (stored in memory) periodically during the operation of the refrigeration system 124 to estimate an internal resistance of the battery pack 120. The voltage and the estimated resistance of the battery pack 120 are compared to respective known full-load and no-load values to predict a state of charge of the battery pack 120. The control module 260 makes control decisions (e.g., adjusts various operating parameters of the refrigeration system 124) to ensure adequate unit run time and to prevent excessive discharge of the batteries of the battery pack 120.

Additionally, the present values of the voltage and the estimated resistance of the battery pack 120 are compared to historical readings stored in the memory during prior operations of the refrigeration system 124. If the present values of the voltage and the estimated resistance of the battery pack 120 are similar to the historical readings (e.g., if deviation between present and historical readings is less than a predetermined threshold), the batteries in the battery pack 120 are considered to be healthy (i.e., able to fully charge and retain full charge and supply voltage/current according to rated capacity).

If the voltage and the estimated resistance of the battery pack 120 are not similar to the historical readings (e.g., if deviation between present and historical readings is greater than a predetermined threshold), the batteries in the battery pack 120 are considered to be not healthy (i.e., not able to fully charge and retain full charge and supply voltage/current according to rated capacity). For example, the present full-load voltage may be less than a historical value by more than a predetermined threshold, and/or the present internal resistance may be greater than a historical value by more than a predetermined threshold. A notification is sent to alert the user (e.g., the driver of the vehicle) (e.g., by displaying a message on a display on or connected to the control module 260 or by other audio/visual indicators or network communication) indicating that the batteries in the battery pack 120 need to be serviced or replaced.

Figure 6:
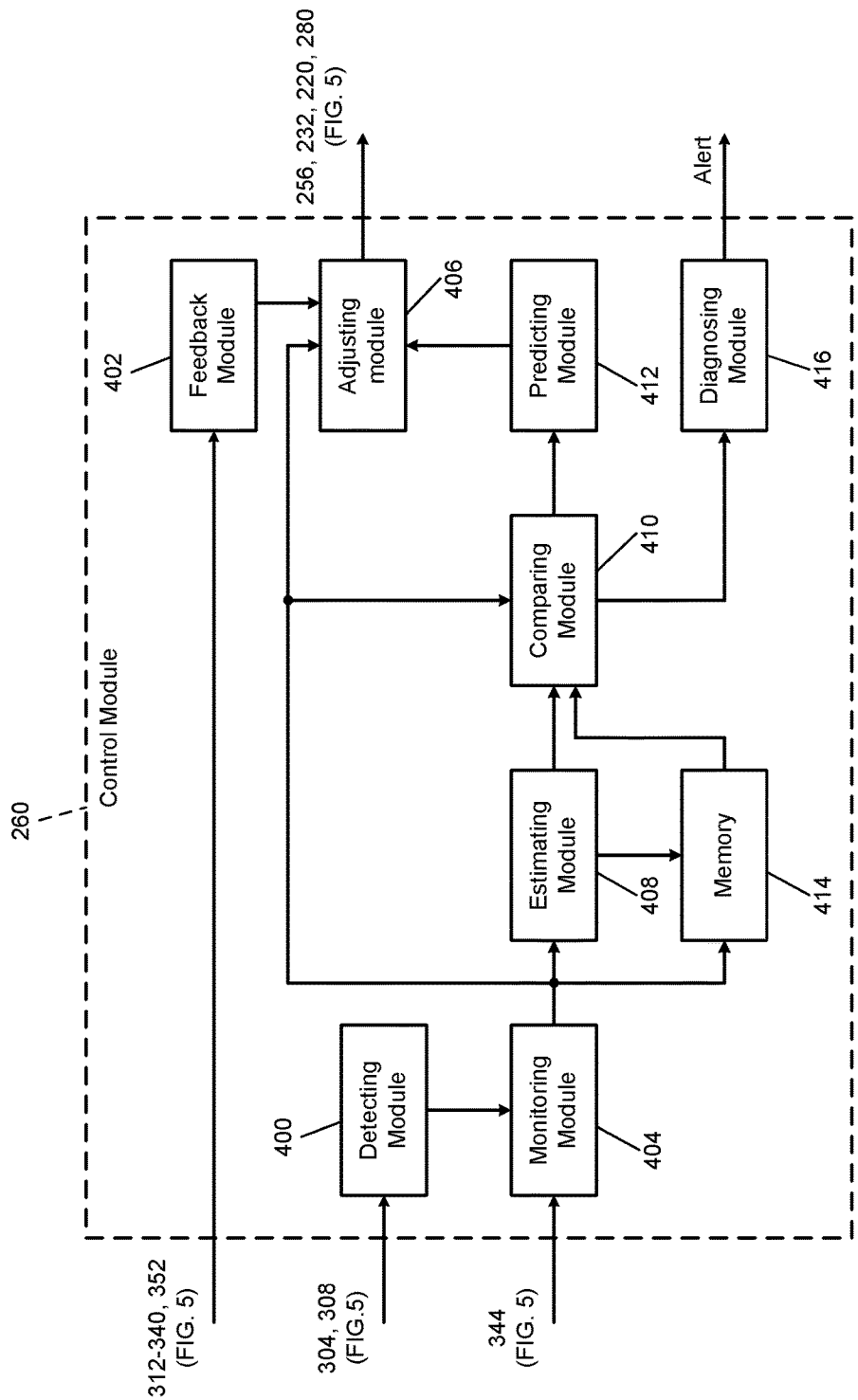
FIG. 6 is a functional block diagram of an example system for monitoring and predicting battery life.

FIG. 6 shows a functional block diagram of an example system for monitoring and predicting battery life. The system determines battery charge (i.e., a state of charge of the battery pack 120) and battery health (e.g., charge retaining capacity, internal resistance, etc. of the battery pack 120) in real time (i.e., during operation of the refrigeration system 124). The system is implemented in the control module 260 shown in FIG. 3. In the control module 260, the system for monitoring and predicting battery life includes a detecting module 400, a feedback module 402, a monitoring module 404, an adjusting module 406, and estimating module 48, a comparing module 410, a predicting module 412, memory 414, and a diagnosing module 416.

The detecting module 400 receives inputs 304 (ignition ON or OFF indication) and 308 (shore power ON or OFF indication) as shown in FIG. 5. While not shown, the detecting module 400 may also receive an indication of whether the battery pack 120 is being charged by the solar panel 172. Depending on the received inputs, the detecting module 400 determines whether the battery pack 120 is being charged by any of the power sources (e.g., shore power, the vehicle 100, or the solar panel 172). The detecting module 400 activates the monitoring module 404 to monitor one or more characteristics of the battery pack 120 depending on whether the battery pack 120 is being charged.

The monitoring module 404 receives the input 344 as shown in FIG. 5. Based on the input 344, the monitoring module 404 monitors one or more characteristics of the battery pack 120 such as voltage, current, and/or temperature. For example, the monitoring module 404 may receive via the input 344 an actual value of the voltage of the battery pack 120 measured directly by a dedicated voltage sensor provided with each battery of the battery pack 120 as explained above with reference to FIG. 5. Alternatively, the monitoring module 404 may infer the voltage of the battery pack 120 from the voltage of the drive 256.

The feedback module 402 receives the inputs 312-340 and 352 as shown in FIG. 5. These inputs include statuses of various operating parameters of the refrigeration system 124 as shown and described with reference to FIG. 5. The feedback module 402 provides feedback regarding the statuses of various operating parameters of the refrigeration system 124 to the adjusting module 406.

The adjusting module 406 adjusts one or more operating parameters of the refrigeration system 124 depending on the charge level and health of the battery pack 120. The adjusting module 406 also decides whether to adjust one or more parameters of the refrigeration system 124 based on the feedback provided by the feedback module 402. The adjusting module 406 generates control signals for controlling the drive 256 (e.g., the speed of the motor 216), the enhanced vapor injection (EVI) valve 232, and the speed of the fans 220 and 280.

To ensure adequate run time and prevent excessive discharge of the batteries of the battery pack 120, the adjusting module 406 adjusts these operating parameters in a predetermined order depending on the charge level and the health of the battery pack 120. Since the compressor 204 draws the most power from the battery pack 120, the adjusting module 406 first reduces the speed of the motor 216. Next, the adjusting module 406 reduces the speed of the condenser fan(s) 220. Next, the adjusting module 406 disables the EVI valve 232 and stops the injection-based cooling and capacity modulation of the compressor 204. Next, the adjusting module 406 turns off the compressor 204, the condenser HEX 212, and the injection, and operates only the evaporator fan(s) 280 to provide cooling using the eutectic plate(s) 268. The adjusting module 406 may also reduce the speed of the evaporator fan(s) 280 to further conserve power.

For example, initially, before starting the refrigeration system 124, when the compressor 204 is turned off, the monitoring module 404 records the no-load voltage of the battery pack 120. The comparing module 410 compares the no-load voltage of the battery pack 120 to a predetermined threshold (e.g., 50V for a 48V battery pack). If the no-load voltage of the battery is greater than or equal to the predetermined threshold, the batteries in the battery pack 120 are considered to be fully charged. The refrigeration system 124 is started and operated normally.

If the no-load voltage of the battery pack 120 is less than or equal to the predetermined threshold, the batteries in the battery pack 120 are considered to be not fully charged. The diagnosing module 416 sends a notification to alert the user (e.g., the driver of the vehicle) (e.g., by displaying a message on a display on or connected to the control module 260 or by other audio/visual indicators or network communication that may be available in the refrigeration system 124) indicating that the batteries in the battery pack 120 are not fully charged. The adjusting module 406 adjusts the operating parameters of the refrigeration system 124 (e.g., the speed of the motor 216, the speeds of the condenser and evaporator fans 220, 280, the EVI valve 232, etc.) based on the no-load voltage of the battery pack 120, and the refrigeration system 124 is started and operated normally.

The monitoring module 404 periodically reads and stores in the memory 414 the voltage and current supplied by the battery pack 120 to the refrigeration system 124 during the operation of the refrigeration system 124. The estimating module 408 estimates the internal resistance of the battery pack 120 based on the voltage and current supplied by the battery pack 120 to the refrigeration system 124 during the operation of the refrigeration system 124. The internal resistance values estimated during the operation of the refrigeration system 124 are also stored in the memory 414.

The comparing module 410 compares the voltage and the estimated resistance of the battery pack 120 to respective known full-load and no-load values. The predicting module 412 predicts a state of charge of the battery pack 120 based on the comparisons. The adjusting module 406 adjusts one or more operating parameters of the refrigeration system 124 (e.g., the speed of the motor 216, the speeds of the condenser and evaporator fans 220, 280, the EVI valve 232, etc.) to ensure adequate unit run time and to prevent excessive discharge of the batteries of the battery pack 120.

Additionally, the comparing module 410 compares the present values of the voltage and the estimated resistance of the battery pack 120 to the respective historical readings stored in the memory 414 during prior operations of the refrigeration system 124. If the present values of the voltage and the estimated resistance of the battery pack 120 are similar to their historical readings (e.g., if deviation between present and historical readings is less than a predetermined threshold), the diagnosing module 416 determines that the batteries in the battery pack 120 are healthy (i.e., the battery pack 120 is able to fully charge and retain full charge and supply voltage/current according to rated capacity).

If the present values of the voltage and the estimated resistance of the battery pack 120 are not similar to the historical readings (e.g., if deviation between present and historical readings is greater than a predetermined threshold), the diagnosing module 416 determines that the batteries in the battery pack 120 are not healthy (i.e., the battery pack 120 is not able to fully charge and retain full charge and supply voltage/current according to rated capacity).

For example, the present full-load voltage of the battery pack 120 may be less than a historical value by more than a predetermined threshold. Additionally or alternatively, the present internal resistance of the battery pack 120 may be greater than a historical value by more than a predetermined threshold. Accordingly, the diagnosing module 416 sends a notification to alert the user (e.g., the driver of the vehicle) (e.g., by displaying a message on a display on or connected to the control module 260 or by other audio/visual indicators or network communication that may be available in the refrigeration system 124) indicating that the batteries in the battery pack 120 need to be serviced or replaced.

Figure 7:
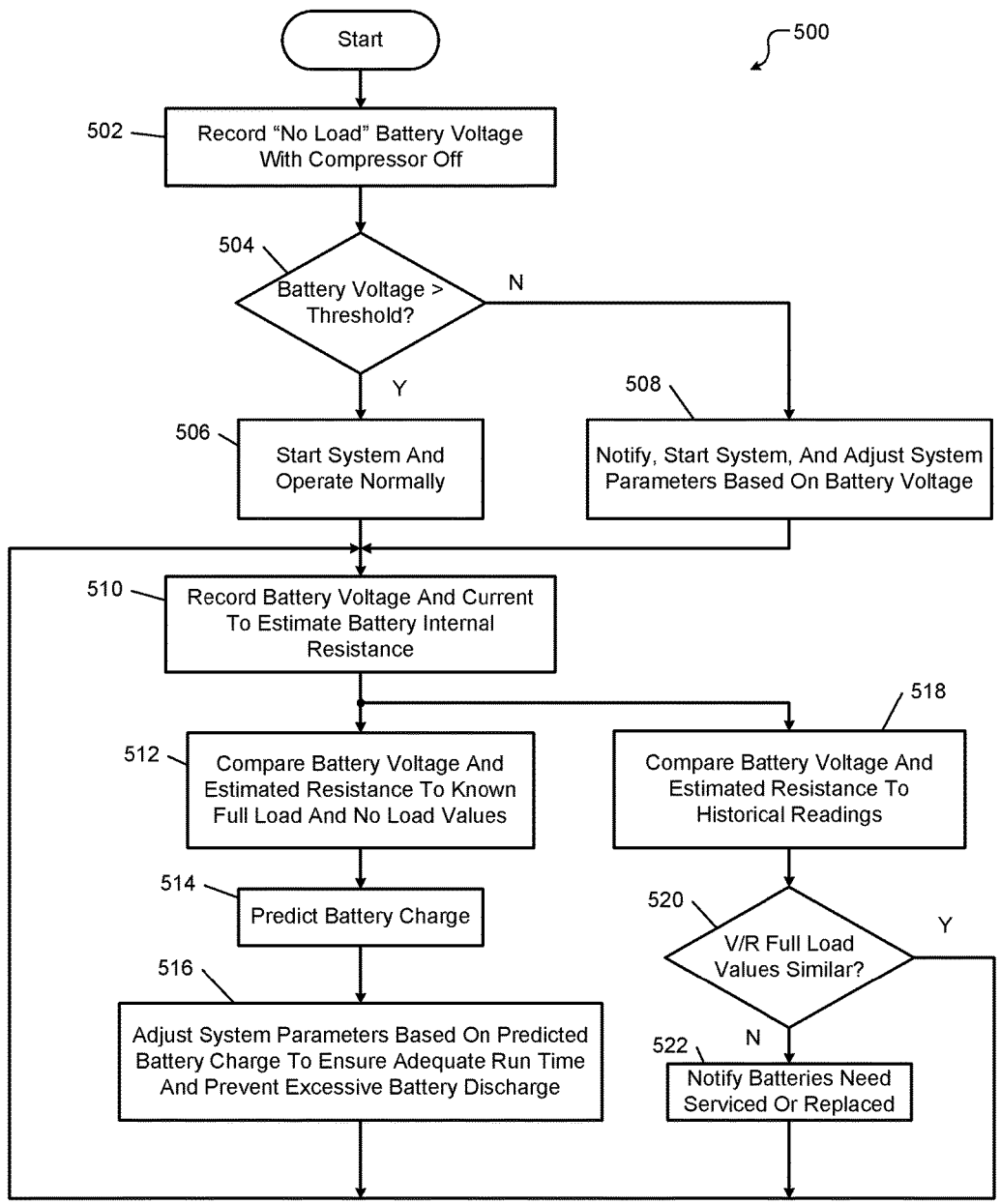
FIG. 7 is a flowchart of an example method for monitoring and predicting battery life.

FIG. 7 shows a flowchart of an example method 500 for monitoring and predicting battery life. The method 500 determines battery charge (i.e., a state of charge of the battery pack 120) and battery health (e.g., charge retaining capacity, internal resistance, etc. of the battery pack 120) in real time (i.e., during operation of the refrigeration system 124). The method 500 is implemented in the control module 260.

At 502, control records a no-load voltage of the battery pack with the compressor turned off. At 504, control determines whether the no-load voltage of the battery pack is greater than or equal to a predetermined threshold. At 506, control starts and operates the refrigeration system normally if the no-load voltage of the battery pack is greater than or equal to a predetermined threshold. At 508, control notifies the user if the no-load voltage is not greater than or equal to a predetermined threshold, adjusts one or more operating parameters of the refrigeration system based on the no-load voltage, and starts the refrigeration system using the adjusted one or more parameters.

At 510, control records in memory the voltage and current readings of the battery pack taken during the operation of the refrigeration system and estimates an internal resistance of the battery pack based on the readings. At 512, control compares the voltage and the estimated resistance of the battery pack to known respective full load and no-load values. At 514, based on the comparisons, control predicts a state of charge of the battery pack. At 516, based on the state of charge of the battery pack, control adjusts one or more system parameters to ensure adequate runtime and prevent excessive battery discharge, and control returns to 510.

At 518, control compares the present values of the voltage and the estimated internal resistance of the battery pack to respective historical readings. At 520, control determines whether the present values are similar to historical values (i.e., whether the deviations between the respective present and historical values are greater or less than predetermined amounts). Control returns to 510 if the present values are similar to the historical values (i.e., the deviations between the respective present and historical values are less than predetermined amounts). At 522, control notifies the user that the batteries need to be serviced or replaced if the present values are different from the historical values by more than predetermined amounts, and control returns to 510.

As used herein, the state of charge (SOC) and the internal resistance of the battery pack are terms of art. The SOC is the equivalent of a fuel gauge for a battery or a battery pack. The units of SOC are percentage points (0%=empty; 100%=full). An alternate form of the same measure is the depth of discharge (DoD), the inverse of SOC (100%=empty; 0%=full) and may be used instead of SOC in the present disclosure. SOC is normally used when discussing the present state of a battery in use, while DoD is most often used when discussing the lifetime of the battery after repeated use.

A practical electrical power source, such as a battery or a battery pack (e.g., the battery pack 120), which is a linear electric circuit, maybe represented as an ideal voltage source in series with an impedance called an internal resistance of the source. When the source delivers current, the measured voltage output is lower than the no-load voltage of the source. The difference is due to a voltage drop caused by the internal resistance.

A battery may be modeled as a voltage source in series with its internal resistance. In practice, the internal resistance of a battery depends on its size, chemical properties, age, temperature, and discharge current. Therefore, the internal resistance of a battery is a good indicator of its condition. In use, the voltage across the terminals of a battery driving a load (i.e., the full load voltage) decreases until it drops too low to be useful. This is largely due to an increase in the internal resistance of the battery rather than a drop in the voltage of the equivalent source. In some rechargeable batteries, the internal resistance is largely independent of the state of charge but increases as the battery ages. Accordingly, the internal resistance of a battery is a good indicator of the expected life of the battery.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for operating a refrigeration system for a vehicle including a compressor in fluid communication with a condenser and an evaporator, the compressor including a variable speed motor and employing capacity modulation using refrigerant injection, and the condenser and the evaporator including variable speed fans, the method comprising:
   monitoring one or more characteristics of a battery supplying power to the refrigeration system, the battery being charged by one or more sources of power including the vehicle;

controlling one or more operating parameters of one or more of the compressor, the condenser, and the evaporator based on the one or more characteristics of the battery;

monitoring voltage of the battery and current supplied by the battery when the refrigeration system is operating;

estimating an internal resistance of the battery based on the voltage and the current;

comparing the voltage and the internal resistance to respective values measured when the compressor is turned off and to respective values measured when the compressor is operating at full capacity;

predicting a state of charge of the battery based on the comparisons; and adjusting the one or more operating parameters based on the state of charge of the battery.

2. The method of claim 1 wherein:
the one or more characteristics of the battery include a voltage of the battery, a current supplied by the battery, an internal resistance of the battery, and a state of charge of the battery; and the one or more operating parameters include a speed of the motor of the compressor, use of refrigerant injection by the compressor, a speed of a condenser fan, and a speed of an evaporator fan.

3. The method of claim 1 further comprising reducing the speed of the motor of the compressor based on the one or more characteristics of the battery.

4. The method of claim 1 further comprising reducing a speed of a condenser fan based on the one or more characteristics of the battery.

5. The method of claim 1 further comprising stopping use of refrigerant injection by the compressor based on the one or more characteristics of the battery.

6. The method of claim 1 further comprising sequentially turning off the compressor and a condenser fan and then reducing a speed of an evaporator fan based on the one or more characteristics of the battery.

7. The method of claim 1 further comprising in response to the one or more characteristics of the battery being less than or equal to a predetermined threshold, sequentially reducing a speed of the motor of the compressor, reducing a speed of a condenser fan, stopping use of refrigerant injection by the compressor, and reducing a speed of an evaporator fan after turning off the compressor and the condenser fan.

8. The method of claim 1 further comprising:
determining a state of charge of the battery; and
in response to the state of charge being less than or equal to a predetermined threshold, sequentially reducing a speed of the motor of the compressor, reducing a speed of a condenser fan, stopping use of refrigerant injection by the compressor, and reducing a speed of an evaporator fan after turning off the compressor and the condenser fan.

9. The method of claim 1 further comprising:
monitoring voltage and current supplied by the battery;
estimating an internal resistance of the battery based on the voltage and current;
estimating a state of charge of the battery based on the voltage and the internal resistance; and
in response to the state of charge being less than or equal to a predetermined threshold, sequentially reducing a speed of the motor of the compressor, reducing a speed of a condenser fan, stopping use of refrigerant injection by the compressor, and reducing a speed of an evaporator fan after turning off the compressor and the condenser fan.

10. The method of claim 1 further comprising:
monitoring a voltage of the battery;
estimating an internal resistance of the battery; and
indicating whether to service or replace the battery based on the voltage and the internal resistance of the battery.

11. The method of claim 1 further comprising:
monitoring voltage of the battery when the compressor is off; and
adjusting one or more of the operating parameters in response to the voltage of the battery being less than or equal to a predetermined threshold.

12. The method of claim 1 further comprising:
monitoring voltage of the battery and current supplied by the battery when the refrigeration system is operating;
estimating an internal resistance of the battery based on the voltage and the current;
comparing the voltage and the internal resistance to respective values stored during prior operations of the refrigeration system; and
indicating whether to service or replace the battery based on the comparison.

13. The method of claim 12 further comprising indicating that the battery needs servicing or replacing in response to the internal resistance increasing or the voltage decreasing by respective predetermined amounts relative to the stored values.

* * * * *